United States Patent [19]
Pollock et al.

[11] Patent Number: 5,577,595
[45] Date of Patent: Nov. 26, 1996

[54] ACCUMULATOR FOR CONVEYOR SYSTEM

[75] Inventors: Daniel A. Pollock, Perrysburg; Stephen L. Cechner, Toledo; Charles R. Coleman, Oregon, all of Ohio

[73] Assignee: Roe Incorporated, Perrysburg, Ohio

[21] Appl. No.: 343,189

[22] Filed: Nov. 22, 1994

Related U.S. Application Data

[63] Continuation-in-part of Ser. No. 141,775, Oct. 25, 1993, Pat. No. 5,366,063, which is a continuation of Ser. No. 6,614, Jan. 21, 1993, Pat. No. 5,255,773.

[51] Int. Cl.$^6$ .................................................. B65G 1/00
[52] U.S. Cl. .................................................. 198/347.3
[58] Field of Search ........................... 198/347.1, 347.2, 198/347.3, 801

[56] References Cited

U.S. PATENT DOCUMENTS

| | | | |
|---|---|---|---|
| 3,317,029 | 5/1967 | Goldammer et al. | 198/801 X |
| 3,499,555 | 3/1970 | Wahle | 198/347.3 |
| 3,788,054 | 1/1974 | Haussmann et al. | 198/347.3 X |
| 4,273,234 | 6/1981 | Bourgeois | 198/347.3 |
| 4,809,482 | 3/1989 | Horton et al. | 53/131.3 |
| 5,009,303 | 4/1991 | Lutzke | 198/347.3 |
| 5,038,909 | 8/1991 | Covert | 198/347.3 |
| 5,121,825 | 6/1992 | Sjogren | 198/347.2 X |
| 5,141,128 | 8/1992 | Pippin | 198/801 X |
| 5,255,773 | 10/1993 | Pollock | 198/347.3 |
| 5,366,063 | 11/1994 | Pollock | 198/347.3 |

OTHER PUBLICATIONS

Roe–Lift Brochure, Roe Inc., Copyright 1988.
Roe–Lift II Brochure, Roe, Inc., Copyright 1990.
A Vertical Accumulators Brochure, Covert Corp. Copyright 1990.
Salwasser Automatic Casing Systems Brochure (undated).
Nercon Vertical Accumulator Brochure (undated).

*Primary Examiner*—James R. Bidwell
*Attorney, Agent, or Firm*—MacMillan, Sobanski & Todd

[57] ABSTRACT

An accumulator for storing rows of articles thereon includes a frame having upper and lower shafts rotatably supported thereon. A plurality of sprockets are mounted on each of the upper and lower shafts for rotation therewith. Each of the sprockets defines a radius. An electric motor is provided for selectively rotating the shafts and the sprockets mounted thereon. A plurality of roller chains are mounted on associated pairs of the upper and lower sprockets for movement when the shafts and sprockets are rotated. Each of the roller chains includes a plurality of spaced apart pins. A plurality of link are carried on each of the roller chains for movement therewith. Each of the links has a pair of apertures formed therethrough and a pair of arcuate slots formed therethrough. The apertures and the slots having respective first edges which define a straight line and respective second edges which define a radius. The radius defined by each of the links is substantially equal to the radius defined by each of the sprockets. Lift rails and lift finger subassemblies are secured to each of the links which define shelf positions for supporting rows of articles thereon. The lift finger subassemblies are oriented at a small angle relative to the links to retain the articles on each of the shelf positions.

20 Claims, 12 Drawing Sheets

70
- ← Emergency Stop (Operator input)
- ← Do Not Accumulate (Operator input)
- ← Filling station idle
- → Filling station start/stop
- ← Upstream Conveyor clear/blocked
- → Engage/disengage squeeze gate
- ← Acccumulator infeed end clear/blocked
- ← Shelf position
- → Start/stop drive means forward/reverse
- → Variable speed drive speed control
- → Start/stop constant speed drive
- ← Carton crush sensor
- → Raise/lower upstream blade stop
- → Raise/lower downstream blade stop
- ← Accumulator discharge end clear/blocked
- ← Downstream conveyor clear/blocked
- ← Packaging station running

FIG. 10

ACCUMULATOR FOR CONVEYOR SYSTEM

CROSS REFERENCE TO RELATED APPLICATION

This application is a continuation-in-part of Ser. No. 08/141,775, filed Oct. 25, 1993 (now U.S. Pat. No. 5,366,063), which was a continuation of Ser. No. 08/006,614, filed Jan. 21, 1993 (now U.S. Pat. No. 5,255,773)

BACKGROUND OF THE INVENTION

This invention relates in general to accumulators for conveyor systems and in particular to an improved structure for an accumulator having vertically movable shelves.

Conveyors are well known devices which are commonly used in production line situations to transport articles from one location to another. For example, a conveyor may be used to transport cartons of a product from an upstream filling station, wherein the cartons are filled with the product and sealed, to a downstream packaging station, wherein the sealed cartons are packaged into larger shipping containers. Many conveyor system structures are known in the art for accomplishing this basic function.

Usually, the conveyor system is designed to provide a continuous flow of articles from the upstream station on the production line to the downstream station. However, occasionally, it becomes necessary to halt this continuous flow of articles. For example, the flow of articles may need to be stopped because one or more of the articles becomes jammed in the production line and must be cleared. Alternatively, the flow of articles may need to be halted because the downstream processing equipment is temporarily unable to accept the continued flow of articles. To accommodate this, some known conveyor systems are provided with a control system which simply ceases the flow of articles therethrough when this occurs. This is frequently undesirable, though, because it requires that the upstream equipment on the production line cease operation until the problem located downstream is corrected.

To address this problem, it is known to provide one or more accumulators midstream within a conveyor system. An accumulator is a device which is typically located between first and second individual conveyors in a conveyor system. When the production line is operating normally, the accumulator receives products from the first conveyor and merely transports them therethrough to the second conveyor. However, when a problem occurs in the downstream portion of the production line, such as described above, the accumulator receives products from the first conveyor and temporarily stores them therein until the problem is corrected. Thus, the accumulator functions to temporarily prevent the flow of the articles downstream thereof, while permitting the upstream portion of the production line to continue, at least temporarily, in normal operation.

Many different accumulator structures are known in the art. One type of accumulator structure is known as a horizontal accumulator. A typical horizontal accumulator includes a plurality of horizontally spaced, parallel storage paths. One or more entrance gates are provided for directing the flow of products from the first conveyor to one of the storage paths as necessary. In this manner, the flow of products downstream is temporarily prevented. When it is desired to resume the flow of products downstream of the horizontal accumulator, one or more exit gates are opened so as to direct the stored products from the storage paths into the second conveyor. While horizontal accumulators of this general type are effective for temporarily preventing the flow of products therethrough, they have been found to be inefficient because of their physical size. Specifically, the parallel storage paths of these horizontal accumulators occupy an undesirable large amount of floor space in the facility in which they are used.

To minimize this floor space problem, a second type of accumulator structure, known as a vertical accumulator, has been developed. A typical vertical accumulator includes a plurality of vertically spaced, parallel storage paths. Articles passing through the vertical accumulator are received from the first conveyor and stored in groups on shelves. When a first shelf is filled with a plurality of articles, it is elevated above the vertical height of the first and second conveyors to permit a second shelf to be filled in a similar manner. When it is desired to return the stored products to the conveyor system, the shelves are sequentially lowered to permit the articles to be fed to the second conveyor. Thus, it can be seen that vertical accumulators occupy a relatively small amount of floor space in the facility in which they are used and, therefore, are generally preferable to the horizontal accumulators described above.

Many different vertical accumulator structures are known in the art. In a first type of vertical accumulator, the articles are lifted above the vertical height of the conveyor system by opposed lifting flanges which engage the peripheral edges of the articles. This type of vertical accumulator is undesirable because the spacing between the lifting flanges must be varied when articles of varying size are to be stored. In a second type of vertical accumulator, the articles are lifted above the vertical height of the conveyor system by shelves formed from a plurality of individual fingers. The fingers pass upwardly between cantilevered rollers of the conveyor to lift the articles upwardly. The capacity of both of these types of vertical accumulators is limited by the vertical space available above the conveyor.

A third type of vertical accumulator uses an endless member mounted about a conveyor section. A plurality of cantilevered shelves are attached at spaced intervals to the endless member, while a shroud is disposed about the endless member and shelves above the conveyor section. When accumulation of the articles is desired, the endless member is rotated, causing the cantilevered shelves to sweep a row of the articles laterally off of the conveyor section and upwardly against the surrounding shroud. The shroud functions to retain the articles on the shelves as they are swept in an arcuate path off of the conveyor section and upwardly. As the endless member is further rotated, additional shelves can be stored with products. Because the shroud extends over the upper portion of the vertical accumulator, the shelves of stored products may be swept in an arcuate manner over such upper portion and downwardly on the other side of the vertical accumulator. As a result, this type of vertical accumulator has a relatively large storage capacity. However, it has been found that this type of vertical accumulator is not easily adaptable for use with articles of varying size because such articles must engage the enclosing shroud to function as described above. As a result, the shroud must be re-positioned each time articles of a different size are to be accumulated. This can be a difficult and time consuming operation. Thus, it would be desirable to provide an improved structure for an accumulator which can easily accommodate articles of varying size.

SUMMARY OF THE INVENTION

This invention relates to an improved structure for an accumulator which has a relatively high storage capacity, occupies a relatively small amount of floor space, and is readily adapted for use with products of varying size. The accumulator includes storage shelves positioned adjacent the conveyor. Each storage shelf includes a lift rail, a first row of fingers cantilevered from the lift rail, and may include a second row of fingers cantilevered from the same lift rail. The lift rail is mounted to an endless chain loop which meshes with an upper and a lower sprocket. When articles are not being accumulated, the lift rail is position with the first row of fingers positioned between the rollers of the conveyor. The fingers are positioned below the tops of the rollers, and so do not interfere with the movement of articles along the conveyor. The second row of fingers is located above the path of articles being conveyed. The articles are transported on the conveyor between the first and second rows of fingers. In order to accumulate the articles, the first row of fingers is moved upwardly between the conveyor rollers to lift a first group of articles off of the conveyor. As subsequent groups of articles are accumulated upon the shelves, the lift rails are incrementally advanced upwardly by the endless chain. As the chain passes over the upper sprocket to the rear of the accumulator, the shelves and articles are inverted. On the rear of the accumulator, the articles are supported by the second row of fingers. The movement of the endless chain may be reversed to deposit the articles back upon the conveyor. No shroud is required to retain the articles on the shelves, since the articles are supported by the fingers or lift rail at all times.

Various objects and advantages of this invention will become apparent to those skilled in the art from the following detailed description of the preferred embodiments, when read in light of the accompanying drawings.

BRIEF DESCRIPTION OF THE DRAWINGS

FIG. 10 is a schematic diagram illustrating an automated control system for the accumulator of FIG. 2.

DETAILED DESCRIPTION OF THE PREFERRED EMBODIMENT

Figure 1:
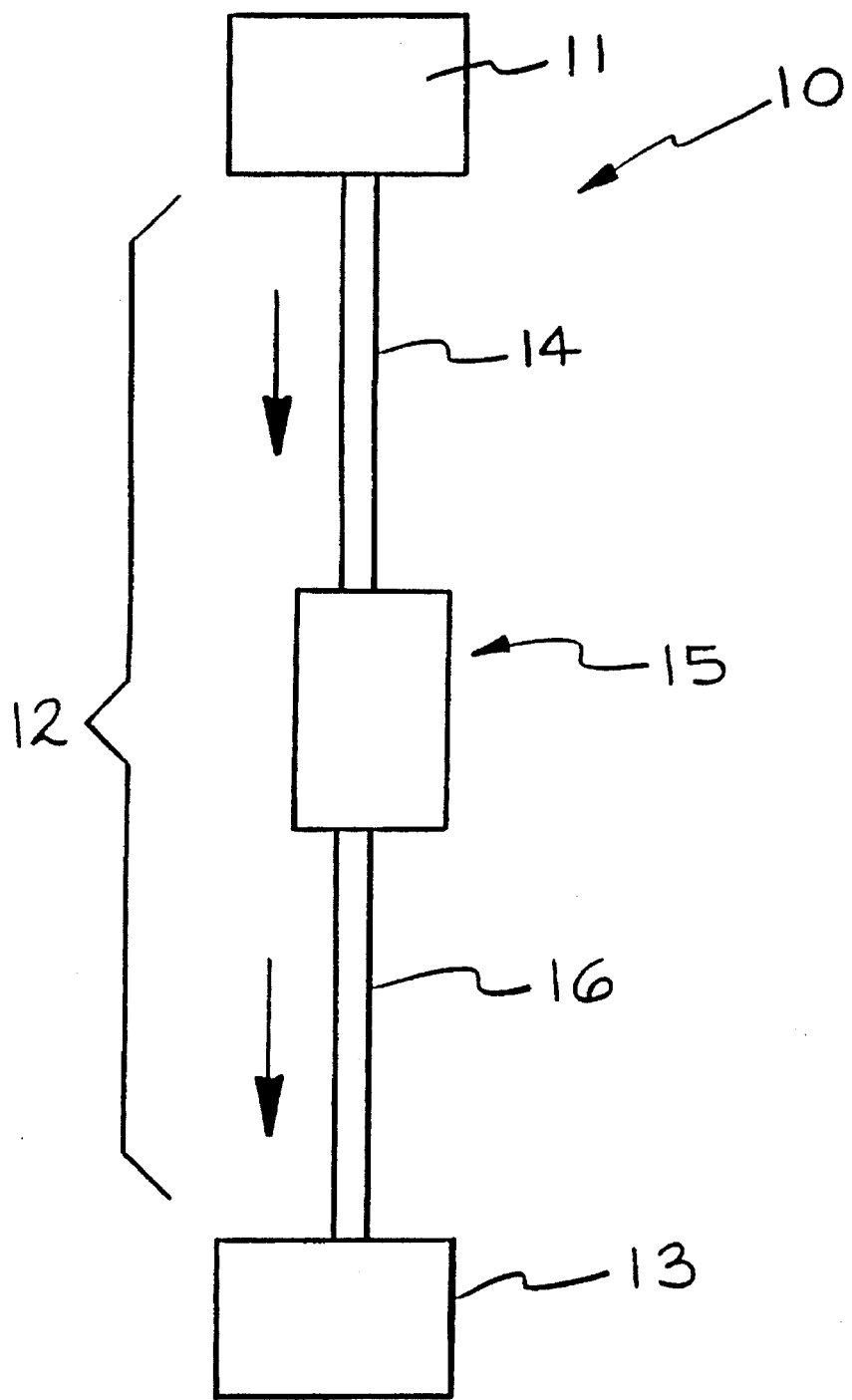
FIG. 1 is a simplified schematic top plan view of an article handling system including an improved accumulator in accordance with this invention.

Referring now to the drawings, there is illustrated in FIG. 1 a simplified schematic top plan view of an article handling system, indicated generally at 10. The article handing system 10 includes an upstream processing station 11, a conveyor system 12, and a downstream processing station 13. The upstream processing station 11 may, for example, be a conventional filling station 11 which is adapted to receive articles, such as empty cartons (not shown in FIG. 1), and fill them with a product. The filled cartons are fed from the filling station 11 through the conveyor system 12 to the downstream processing station 13. The downstream processing station 13 may, for example, be a conventional packaging station 13, wherein the sealed cartons from the conveyor system 12 are packaged into larger shipping containers.

The conveyor system 12 itself is composed of a conventional first conveyor 14 which receives the filled cartons from the filling station 11. The first conveyor 14 transports the articles (in a direction indicated by the upper arrow in FIG. 1) to an accumulator, indicated generally at 15, which is the subject matter of this invention. The structure and operation of the accumulator 15 will be explained and illustrated below in detail. The filled cartons pass from the accumulator 15 to a conventional second conveyor 16. The second conveyor 16 receives the cartons from the accumulator 15 and transports them (in a direction indicated by the lower arrow in FIG. 1) to the packaging station 13. The upstream processing station 11, the first conveyor 14, the second conveyor 16, and the downstream conveyor 13 are conventional in the art and form no part of this invention.

Figure 2:
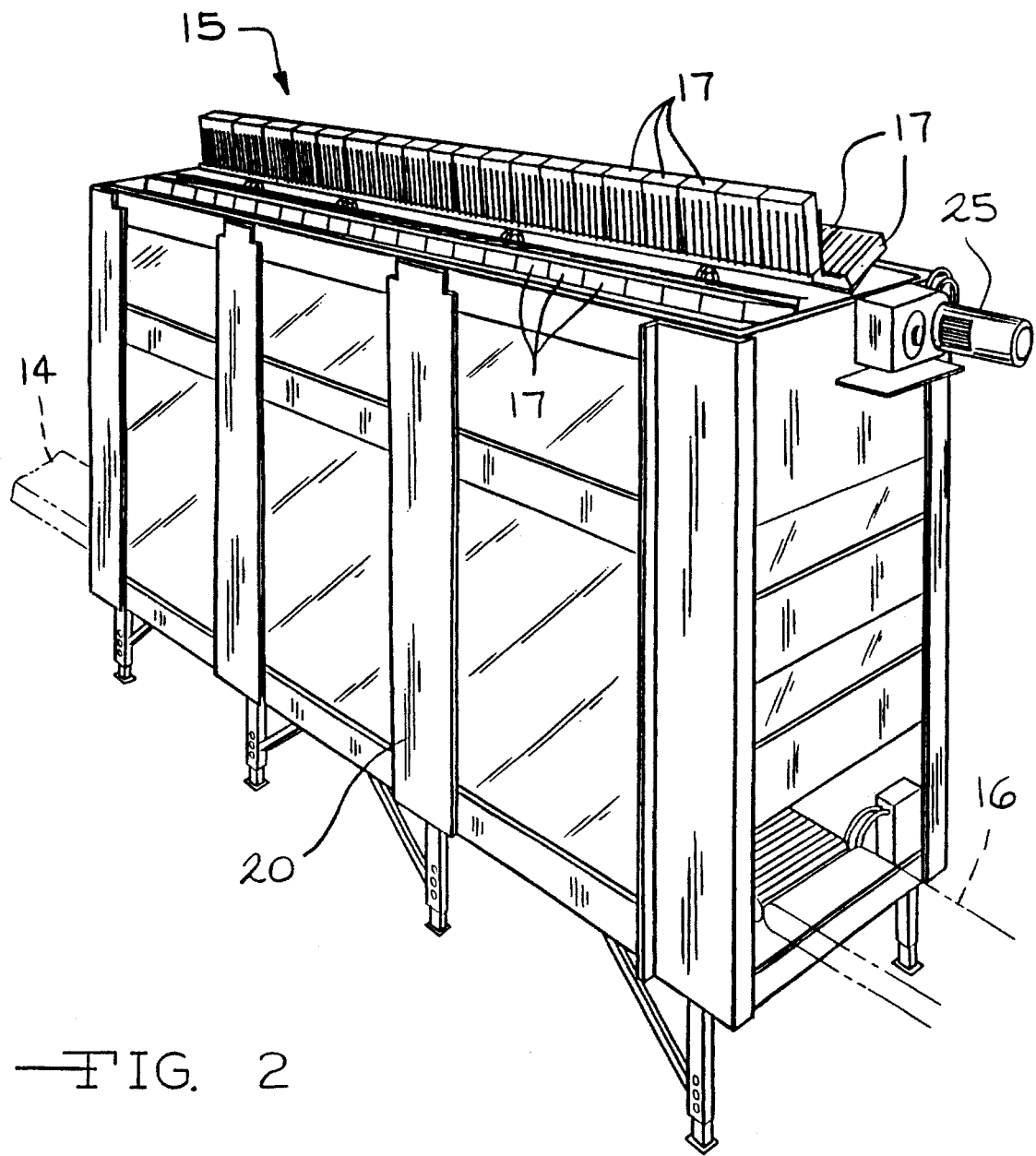
FIG. 2 is a perspective view of the accumulator illustrated in FIG. 1 taken from the discharge end thereof.

Referring now to FIG. 2, the exterior structure of the accumulator 15 is illustrated. The accumulator 15 includes an intake or upstream end which is disposed adjacent to the first conveyor 14. Thus, as discussed above, cartons 17 are delivered from the first conveyor 14 to the intake end of the accumulator 15. As will be discussed in detail below, the accumulator 15 includes a plurality of shelf positions, each of which is adapted to store a plurality of cartons 17 thereon to prevent them from flowing through the accumulator 15 to the second conveyor 16. The discharge end of the accumulator 15 is adapted to discharge cartons onto the second conveyor 16.

Figure 3:
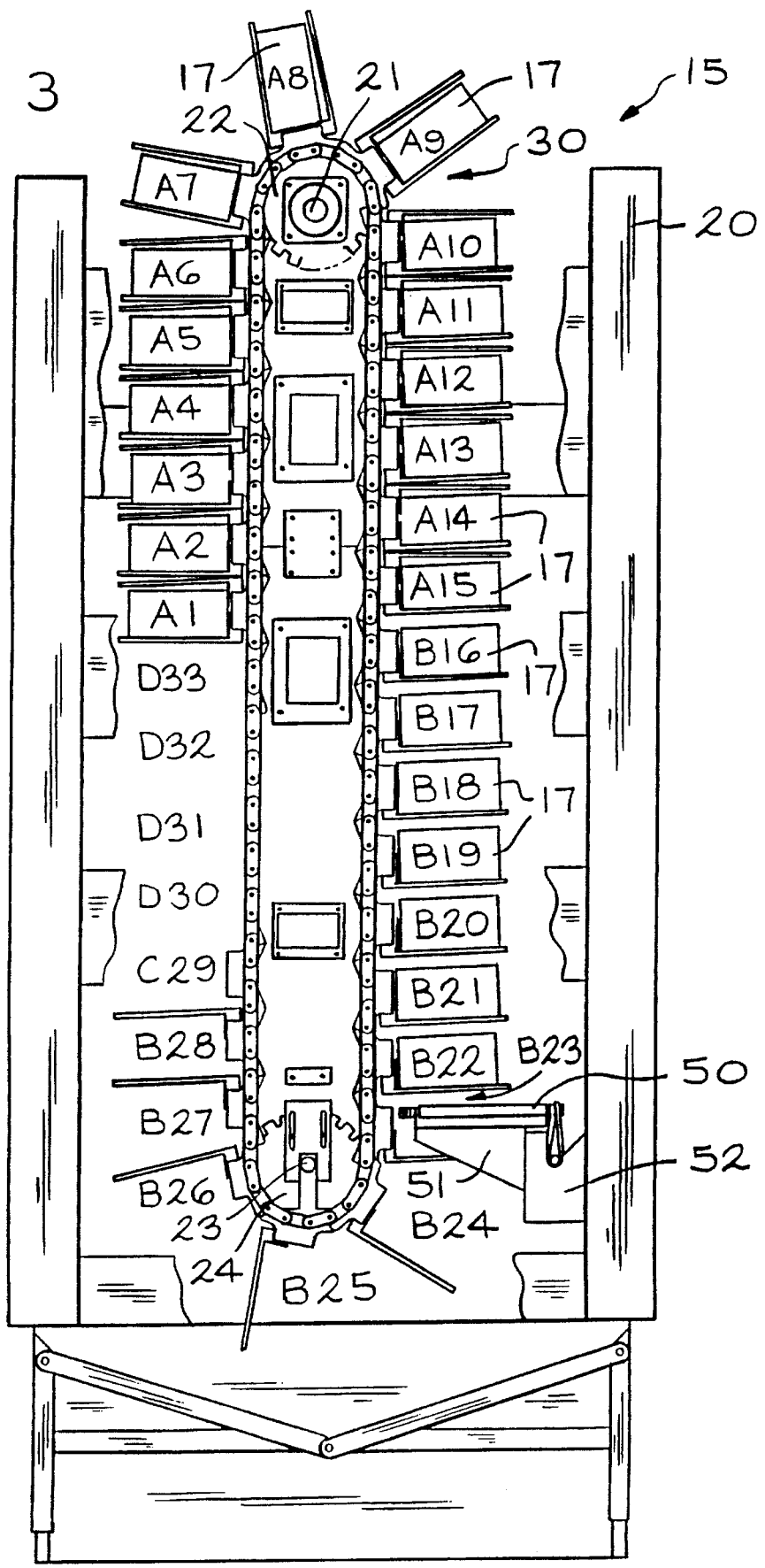
FIG. 3 is an end elevational view of the accumulator illustrated in FIG. 2 taken from the intake end thereof and schematically showing the endless chain and link subassembly.

Referring now to FIG. 3, the structure of the accumulator 15 is illustrated in more detail from the intake end thereof. As shown therein, the accumulator 15 includes a frame 20 for rotatably supporting an upper shaft 21 which extends axially throughout the length thereof. A plurality of upper sprockets 22 (only one is illustrated) are mounted on the upper shaft 21 for rotation therewith. The upper sprockets 22 are axially spaced apart from one another along the length of the upper shaft 21. Similarly, the frame 20 also rotatably supports a lower shaft 23 having a plurality of lower sprockets 24 (only one is illustrated) mounted thereon. The number and spacing of the sprockets 22 and 24 can vary with the overall size of the accumulator 15. A motor 25 (see FIG. 2) is mounted on the frame 20 for selectively rotating the upper shaft 21, as will be explained in detail below.

The accumulator 15 further includes a plurality of endless chain and link subassemblies, indicated generally at 30 (only one is illustrated). Each of the endless chain and link subassemblies 30 respectively extends about one of the associated pairs of the upper sprockets 22 and the lower sprockets 24. Thus, each of the endless chain and link subassemblies 30 meshes with one of the upper sprockets 22 and one of the lower sprockets 24. As a result, when the upper shaft 21 (and the upper sprockets 22 mounted thereon) are rotated by the motor 25, the endless chain and link subassemblies 30 (and the lower shaft 23 having the lower sprockets 24 mounted thereon) are all rotated therewith.

Figure 4:
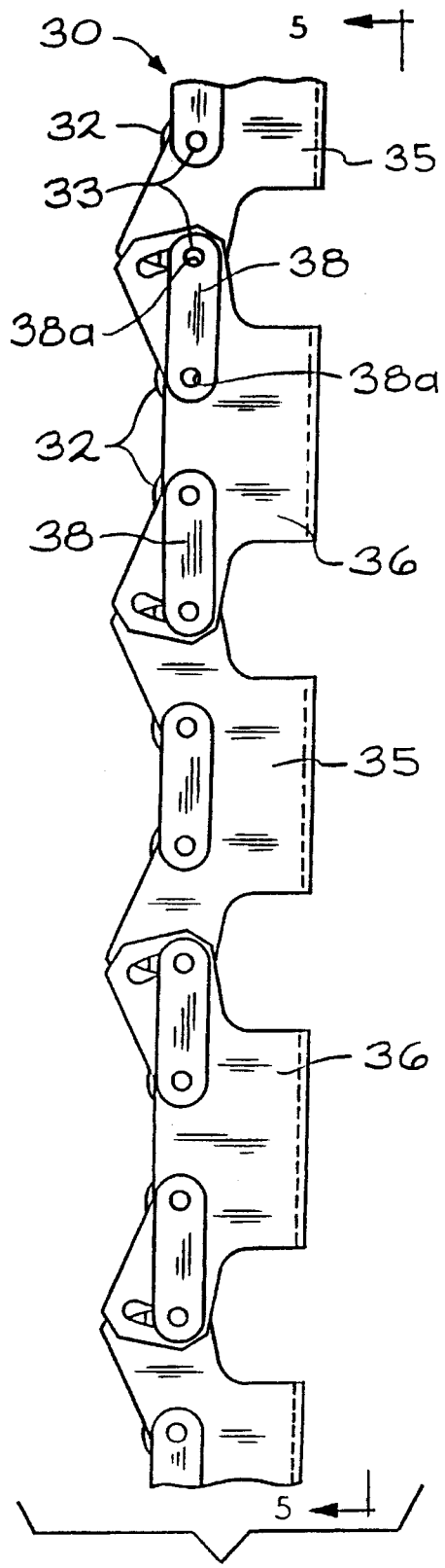
FIG. 4 is an enlarged end elevational view of a portion of the endless chain and link subassembly of the accumulator shown in FIG. 3, the fingers of the subassembly having been removed for clarity.
Figure 5:
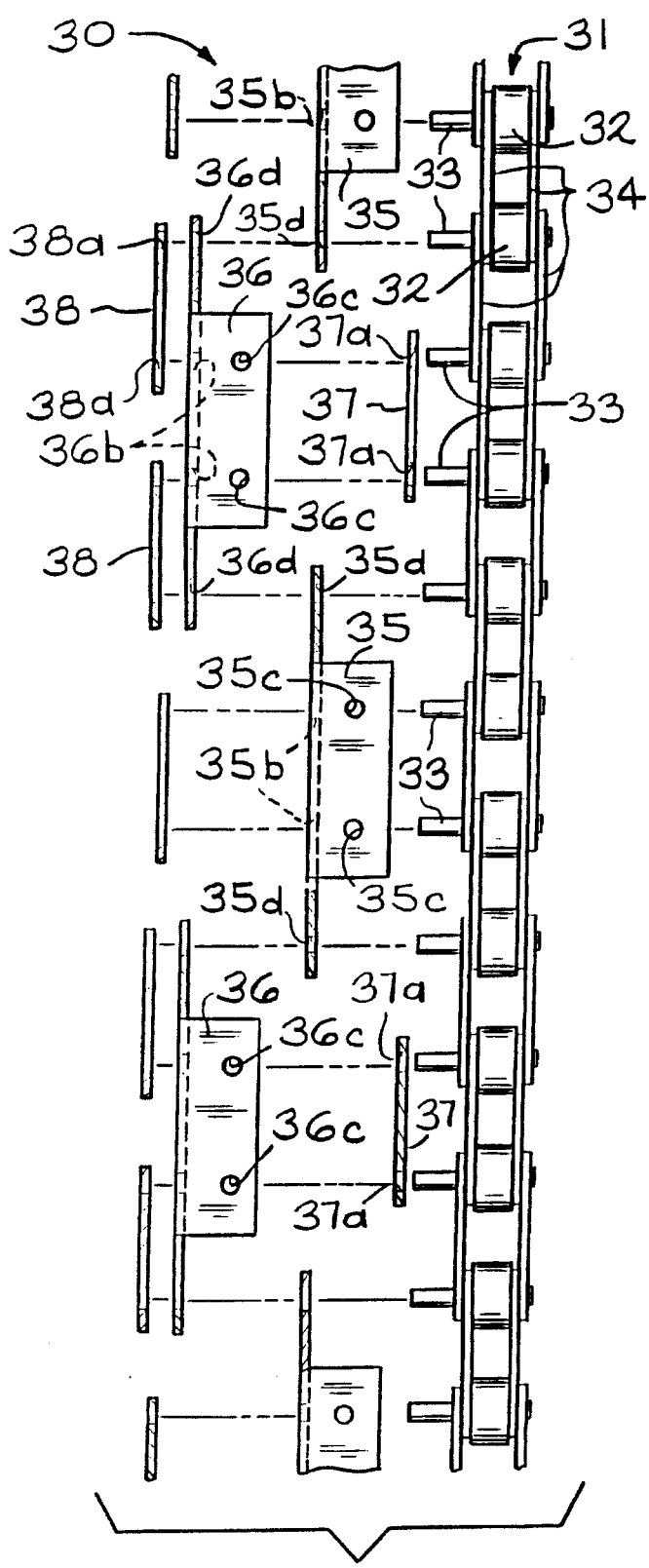
FIG. 5 is an exploded view of the portion of the chain and link subassembly taken along line 5—5 of FIG. 4.

The structure of one of the endless chain and link subassemblies 30 is illustrated in more detail in FIGS. 4 and 5. As shown therein, the subassembly 30 includes an endless chain member, indicated generally at 31, which is preferably embodied as a conventional roller chain. The roller chain 31 includes a plurality of rollers 32, each of which is rotatably mounted on an elongated pin 33. A plurality of connecting members 34 are press fit onto adjacent pins 33 for joining them (and the rollers 32 rotatably supported thereon) together to form the roller chain 31. The structure of the roller chain 31 thus far described is conventional in the art.

Figure 6:
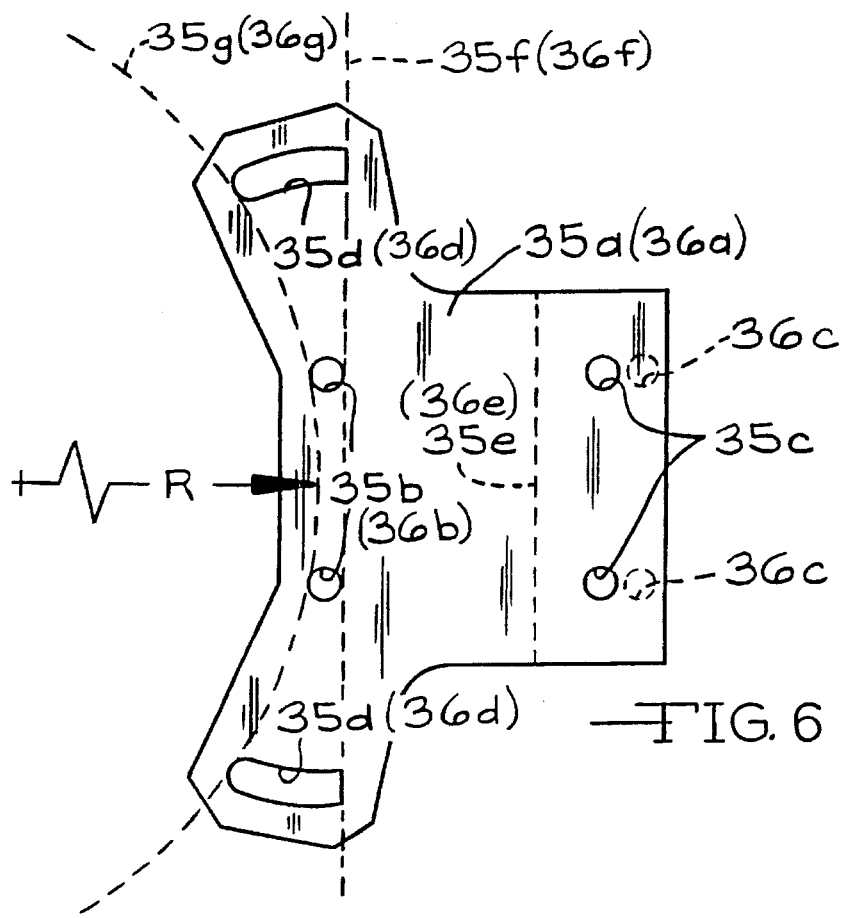
FIG. 6 is an enlarged elevational view of one of the inner links illustrated in FIGS. 4 and 5, wherein an end portion thereof is shown in a preliminary flat condition.
Figure 7:
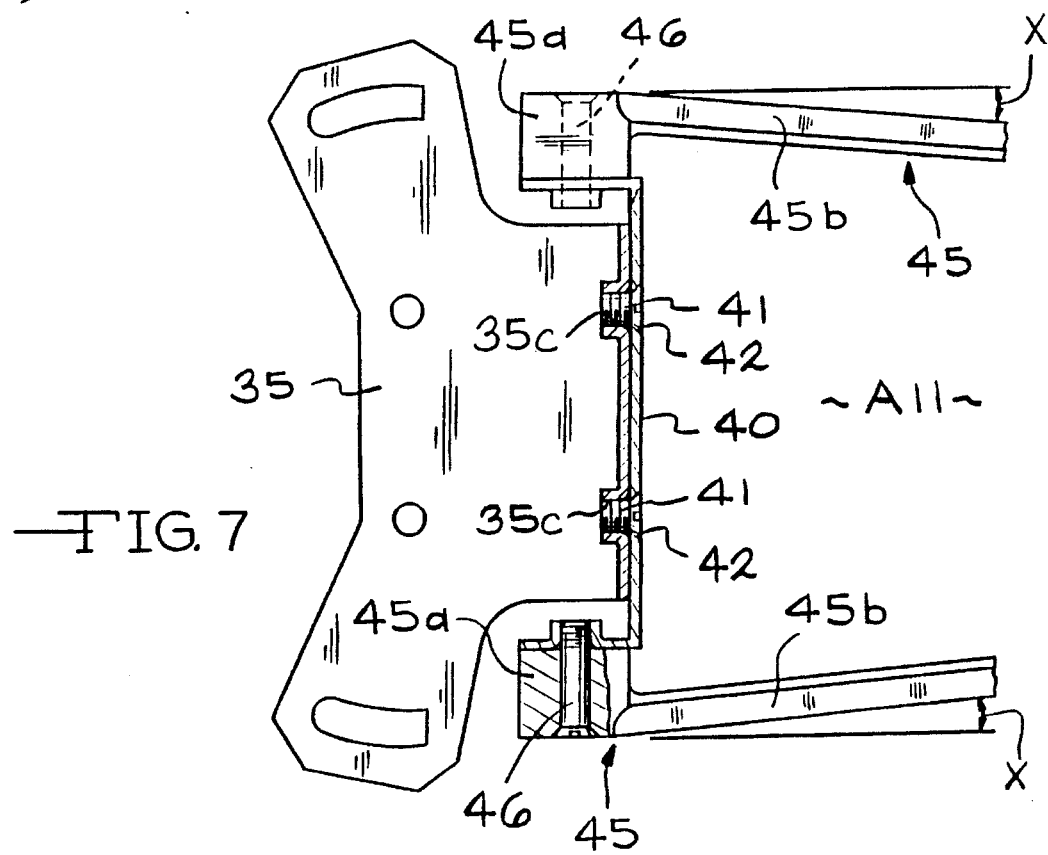
FIG. 7 is an elevational view similar to FIG. 6 showing the inner link after the end portion thereof has been bent and illustrating the manner in which the fingers are secured thereto.

The endless chain and link subassembly 30 further includes a plurality of inner links 35 and outer links 36, all of which are secured to the roller chain 31 for movement therewith. FIG. 6 illustrates a flat blank 35a of metallic material from which one of the inner links 35 can be manufactured. As shown therein, the blank 35a is generally rectangular in shape, but is provided with a pair of opposed ear portions which extend generally apart from one another. First and second pairs of apertures 35b and 35c are formed through the blank 35a. Also, a pair of arcuate slots 35d are formed through the ear portions of the blank 35a. The blanks 35a, as well as the apertures 35b and 35c and the arcuate slots 35d, may be formed by any conventional metal forming process, such as stamping. Then, a portion of the blank 35a is bent along the dotted line 35e so as to extend perpendicular to the remainder thereof to form the inner link 35, as shown in FIG. 7.

The outer edges (the right edges when viewing FIG. 6) of the first pair of apertures 35b and the outer edges of the arcuate slots 35d are linearly and vertically aligned, as shown by the dotted line 35f. The inner edges (the left edges when viewing FIG. 6) of the first pair of apertures 35b and the inner edges of the arcuate slots 35d are aligned along an arc defined by a radius R, as shown by the dotted line 35g. All of the inner links 35 and all of the outer links 36 are formed in this manner. The purpose for this structure will be explained below.

Referring back to FIGS. 4 and 5, it can be seen that each of the inner links 35 is mounted on four adjacent pins 33 of the roller chain 31. Thus, when one of the inner links 35 is installed on the roller chain 31, the elongated pins 33 are received through the first pair of apertures 35b, and through the slots 35d. As also shown in FIG. 5, adjacent ones of the inner links 35 are spaced apart from one another by two elongated pins 33. Between adjacent ones of the inner links 35, a spacer bracket 37 is provided. Each of the spacer brackets 37 is formed from a flat strap having a pair of apertures 37a formed therethrough. The spacer brackets 37 are installed on the roller chain 31 such that the two elongated pins 33 located between adjacent ones of the inner links 35 are received in the apertures 37a. Thus, each of the spacer brackets 37 receives two adjacent pins 33 through its apertures 37a. The apertures 35b formed through the inner link 35 and the apertures 37a formed through the spacer brackets 37 are sized to be slightly larger than the diameters of the elongated pins 33 received therein. Thus, the inner links 35 and the spacer brackets 37 are only loosely mounted on such pins 33 so as not to inhibit the free movement thereof.

As shown in FIG. 6, the outer links 36 are shaped generally the same as the inner links 35 and are formed from a similar blank of material 36a (not shown) having first and second pairs of apertures 36b and 36c and arcuate slots 36d. For a reason which will become apparent below, however, the location of the second pair of apertures 36c in the outer links 36 is slightly offset from the location of the second pair of apertures 35c in the inner links 35. The outer links 36 are mounted on the roller chain 31 in an alternating overlapping manner relative to the inner links 35. Thus, as shown in FIGS. 4 and 5, the upper slot 36d formed on one of the outer links 36 is mounted on the same elongated pin 33 of the roller chain 31 as the lower slot 35d formed on the adjacent one of the inner links 35. Similarly, the lower slot 36d formed on one of the outer links 36 is mounted on the same elongated pin 33 of the roller chain 31 as the upper slot 35d formed on adjacent one of the inner links 35.

Means are provided for retaining the inner links 35 and the outer links 36 on the elongated pins 33 of the roller chain 31 during use. In the illustrated embodiment, this means for retaining includes a plurality of retainer brackets 38. Each of the retainer brackets 38 is formed from a flat strap having a pair of apertures 38a formed therethrough. The retainer brackets 38 are installed on the roller chain 31 such that the two adjacent elongated pins 33 are received in the apertures 38a. Unlike the inner link apertures 35b, the outer link apertures 36b, and the spacer bracket apertures 37a, the retainer bracket apertures 38a are sized to be slightly smaller than the diameters of the elongated pins 33 received therein. Thus, the retainer brackets 38 are press fit onto such pins 33, thereby retaining the inner links 35, the outer links 36, and the spacer brackets 37 thereon to form the endless chain and link subassembly 30.

As mentioned above, the outer links 36 are mounted upon the roller chain 31 in an alternating overlapping manner relative to the inner links 35. Thus, when the endless chain and link subassembly 30 is assembled as described above, all of the outer links 36 are offset from the inner links 35 (and from the roller chain 31 itself) by a distance which is equal to the thickness of the opposed ear portions of the inner links 35 (i.e., the thickness of the blank 35a illustrated in FIG. 4). To compensate for this, the locations of the second pair of apertures 36c formed through the outer links 36 are offset from the locations of the second pairs of apertures 35c formed through the outer links 35. The amount of this offset is equal to the thickness of the opposed ear portions of the inner links 35. Thus, as best shown in FIG. 6, the apertures 36c formed through the outer links 36 are located slightly closer to the right edge of the bent portion thereof than the apertures 35c formed through the outer links 35c. As a result of this offsetting compensation arrangement, it will be appreciated that all of the apertures 35c and 36c are linearly aligned (upwardly and downwardly when viewing FIG. 3) when the endless chain and link subassembly 30 is assembled. The purpose for maintaining these apertures 35c and 36c in such linear alignment will be explained below.

As best shown in FIG. 3, a plurality of shelf positions are defined throughout the length of the endless chain and link subassembly 30. In the illustrated embodiment, thirty-three of such shelf positions are provided on the endless chain and link subassembly 30, although a greater or lesser number may be provided if desired. Most of the shelf positions are adapted to store respective pluralities of cartons 17 thereon, in a manner which will be described in detail below. However, as will also be explained below, a small number of the shelf positions cannot store any cartons 17 thereon. A first group of shelf positions (the first through fifteenth) are identified in FIG. 3 as A1 through A15. A second group of shelf positions (the sixteenth through twenty-eighth) are identified in FIG. 3 as B16 through B28. A third group of shelf positions (the twenty-ninth only) is identified in FIG. 3 as C29. A fourth group of shelf positions (the thirtieth through thirty-third) are identified in FIG. 3 as D30 through D33.

Referring now to FIG. 7, the structure of one of the shelf positions A11 is illustrate in detail. As shown therein, a lift rail 40 is secured to the inner link 35. The lift rail 40 has an inverted-C cross sectional shape, including a central portion which is secured to the inner link 35 by means of a pair of threaded fasteners 41 and having upper and lower end flanges. The threaded fasteners 41 extend through apertures 42 which are formed through the central portion of the lift rail 40 and which are aligned with the second pair of apertures 35b formed through the bent portion of the inner link 35. In the illustrated embodiment, the second pair of apertures 35b formed through the bent portion of the inner link 35 are provided with respective threaded extruded portions into which the threaded fasteners 41 are received. However, the lift rail 40 may be secured to the inner link 35 by any conventional means.

Figure 8:
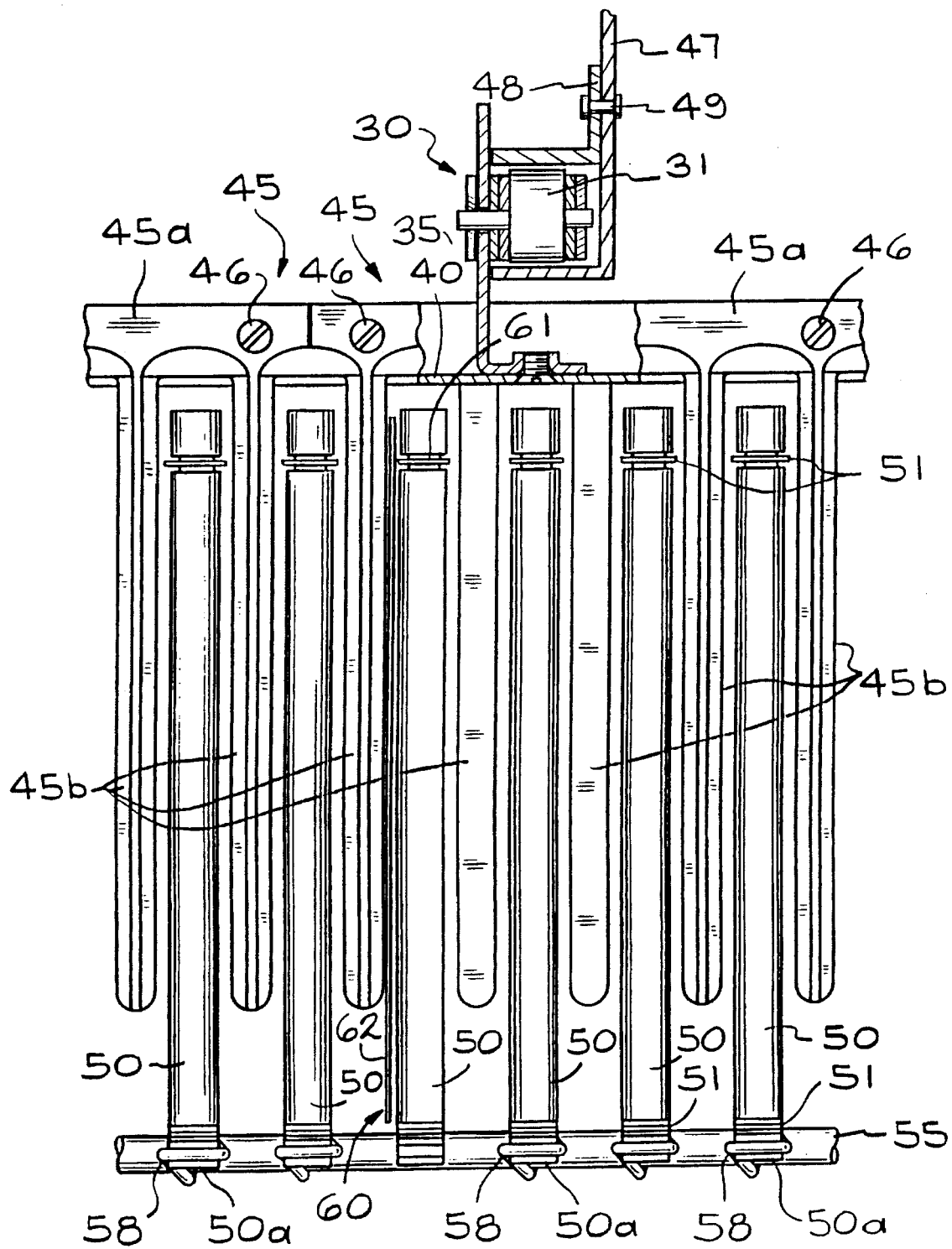
FIG. 8 is a top plan view of a portion of the conveyor mechanism for the accumulator shown in FIG. 3.

As shown in FIG. 8, the lift rail 40 is an elongated member which extends longitudinally throughout the accumulator 15. As mentioned above, a plurality of endless chain and link subassemblies 30 are spaced longitudinally throughout the accumulator 15. The lift rail 40 is secured to each of the endless chain and link subassemblies 30 in the manner described above. Thus, when the endless chain and link subassemblies 30 are moved by the motor 25 as described above, the lift rail 40 is raised and lowered therewith. A similar lift rail 40 is secured to each of the other inner and outer links 35 and 36 which constitute the remainder of the first group of shelf positions A1 through A15, to each of the inner and outer links 35 and 36 which constitute the second group of shelf positions B16 through B28, and to each of the inner and outer links 35 and 36 which constitute the third group of shelf positions C29. However, for a reason which will be explained below, no lift rails 40 are provided to the portions of the endless chain and link subassembly 30 which constitute the fourth group of shelf positions D30 through D33.

Again referring to FIG. 7, it can be seen that a lift finger subassembly 45 is secured to each of the upper and lower end flanges of the lift rail 40. The lift finger subassemblies 45 are secured to the upper and lower end flanges of the lift rail 40 by threaded fasteners 46 which extend through aligned apertures formed therein. In the illustrated embodiment, the apertures formed through the upper and lower end flanges of the lift rail 40 are provided with respective threaded extruded portions into which the threaded fasteners 46 are received. However, the lift finger subassemblies 45 may be secured to the lift rail 40 by any conventional means.

As most clearly seen in FIG. 8, each of the lift finger subassemblies 45 is formed generally in the shape of a comb, including a central base portion 45a having a plurality of individual lift fingers 45b extending outwardly therefrom. The base portions 45a of the lift finger subassemblies 45 are secured to the lift rail 40 by the threaded fasteners 46, as described above. Each of the shelf positions A1 through B28 of the accumulator 15 is defined by a plurality of lift finger subassemblies 45 which are fastened in adjacent relationship with one another along the length of the associated lift rail 40.

The lift finger subassemblies 45 are preferably formed as a unitary piece to facilitate proper alignment thereof during installation. It has been found desirable to mold the lift finger subassemblies 45 from a relatively rigid, light weight plastic material. Each of the individual lift fingers 45b has a cross-sectional shape which is elongated in the direction perpendicular to the plane defined by the base portion 45a. The elongated cross-section provides the lift fingers 45b with adequate stiffness to support cartons 17 thereon, while minimizing the weight of the lift fingers 45b.

The individual lift fingers 45b of the lift finger subassemblies 45 extend outwardly from the lift rail 40 to define the shelf A11. Preferably, these individual lift fingers 45b extend at an angle relative to a horizontal plane extending perpendicular relative to the vertical plane defined by the central portion of the lift rail 40. As shown in FIG. 7, the angle X represents the angle at which each of the individual lift fingers 45b extend relative to such perpendicular horizontal plane. It has been found desirable to define the angle X to be approximately from two to four degrees.

A similar plurality of lift finger subassemblies 45 (having individual lift fingers 45b provided thereon) is secured to each of the upper and lower end flanges of the other lift rails 40 which constitute the remainder of the first group of shelf positions A1 through A15. As shown in FIG. 3, however, only a single plurality of lift finger subassemblies 45 is secured to one of the end flanges of each of the lift rails 40 which constitute the second group of shelf positions B16 through B28. Thus, individual lift fingers 45b are provided on only the lower end flanges of the lift rails 40 in the second group of shelf positions B16 through B28. No lift finger subassemblies 45 are secured to the lift rails 40 which constitute the third group of shelf positions C29. As mentioned above, there are no lift rails 40 provided for any of the fourth group of shelf positions D30 through D33. Thus, no lift finger subassemblies 45 are provided for those shelf positions D30 through D33 either. The reason for this varying number of lift finger subassemblies 45 in the different groups of shelf positions will be explained below.

As mentioned above, the inner links 35 and the outer links 36 differ in structure in that their respective second pairs of apertures 35c and 36c are formed in offset positions relative to one another. Therefore, these apertures 35c and 36c are linearly and vertically aligned when installed on the endless chain and link subassemblies 30. As also mentioned above, the lift rails 40 are secured to the inner links 35c and outer links 36c by means of fasteners 41 which extend through such aligned apertures 35c and 36c. As a result, the lift rails 40 (and the individual lift finger subassemblies 45 mounted thereon) are all linearly and vertically aligned with one another for use, as shown in FIG. 3.

Referring back to FIG. 3, it can be seen that the illustrated endless chain and link subassembly 30 extends about both the upper sprocket 22 and the lower sprocket 24. As mentioned above, a plurality of pairs of upper sprockets 22 and lower sprockets 24 are mounted along the lengths of the upper shaft 21 and the lower shaft 23, respectively. For each of these pairs of upper and lower sprockets 22 and 24, an endless chain and link subassembly 30 is carried thereon as shown in FIG. 3. Thus, when the upper shaft 21 is rotated by the motor 25, the cooperation of the endless chain and link subassemblies 30 with the upper and lower sprockets 22 and 24 causes corresponding rotation of the lower shaft 23.

Referring now to FIG. 8, the manner in which the endless chain and link subassemblies 30 is supported on the accumulator 15 for movement is illustrated. As shown therein, first and second L-shaped brackets 47 and 48, respectively, are provided for supporting and guiding the endless chain and link subassembly 30 for movement. The first L-shaped bracket 47 has a first leg portion which is secured to the frame 20 of the accumulator 15 and a second leg portion which extends perpendicular to the first leg portion. The second L-shaped bracket 48 has a first leg portion which is secured to the first leg portion of the first L-shaped bracket 47 by means of threaded fasteners 49 and a second leg portion which extends perpendicular to the first leg portion.

The second leg portions of the first and second L-shaped brackets 47 and 48 define a vertically extending channel, within which the roller chain 31 of the endless chain and link subassembly 30 is supported and guided for movement. If desired, a conventional slot (not shown) or other means may be formed in one of the first or second L-shaped brackets 47 and 48 to facilitate adjustment of the relative positions of the second leg portions and, therefore, the size of the guide channel defined thereby. As discussed above, the inner and outer links 35 and 36 are carried on the roller chain 31, while the lift rails 40 and the lift finger subassemblies 45 are carried on the inner and outer links 35 and 36. A similar guide channel is provided on the back side of the accumulator 15, and for each of the endless chain and link subassemblies 30.

Figure 9:
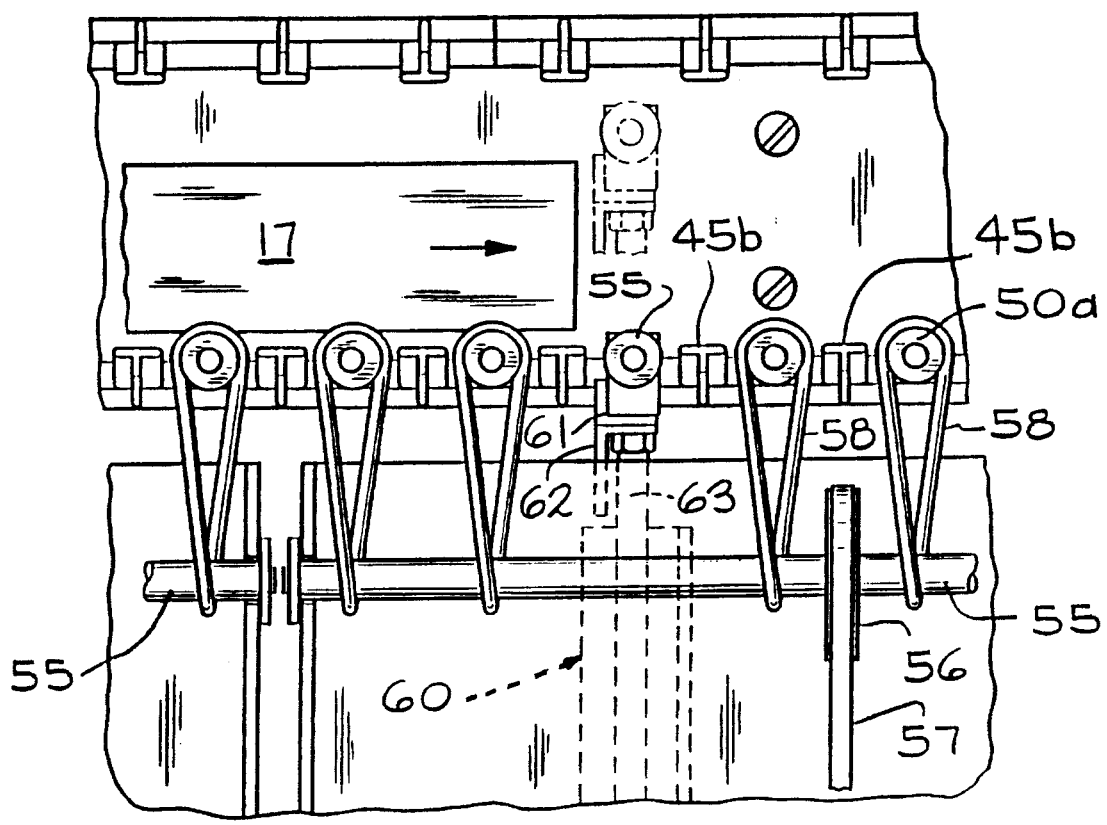
FIG. 9 is a side elevational view of the portion of the conveyor mechanism illustrated in FIG. 8.

Referring now to FIGS. 8 and 9, there is illustrated a means for conveying the cartons 17 from the intake end of the accumulator 15 to the discharge end thereof. This means for conveying includes a plurality of generally cylindrical rollers 50 which are disposed in alternating fashion between the individual lift fingers 45b of the lift finger subassemblies 45. The inner ends of the rollers 50 (i.e., the ends of the rollers 50 adjacent to the lift rails 40) are rotatably supported on respective roller brackets 51 (see FIG. 3) which extends beneath the associated roller 50. As best shown in FIG. 3, the roller bracket 51 is secured to a support bracket 52 which may be pivotably and resiliently mounted on the frame 20 of the accumulator 15. The outer ends of the rollers 50 each have a pulley 50a secured thereto for rotation therewith. The purpose of the pulleys 50a will be explained below.

Means are provided for rotatably driving the rollers 50 so as to advance cartons 17 from the intake end of the accumulator 15 to the discharge end thereof (i.e., in the direction of the arrow in FIG. 9). In the illustrated embodiment, this means for rotatably driving includes a drive shaft 55 which is connected to a motor (not shown) so as to be rotatably driven thereby. In the illustrated embodiment, this is accomplished by a providing a pulley 56 which is mounted on the drive shaft 55 for rotation therewith. A drive belt 57 extends about the pulley 56 and the output shaft of the motor. Thus, when the motor rotates the output shaft, the drive belt 57 causes the drive shaft 55 to rotate as well.

The drive shaft 55 extends axially along the length of the accumulator 15, parallel to the flow of cartons 17 therethrough. A plurality of endless elastomeric bands 58 are provided for connecting the drive shaft 55 to each of the pulleys 50a. Each of the bands 58 extends about a portion of the drive shaft 55 and one of the pulleys 50a. The elastomeric bands 56 are sized to frictionally engage both the drive shaft 55 and the individually pulleys 50a. Thus, when the drive shaft 55 is rotated by the motor, the individual pulleys 50a (and the rollers 50 connected thereto) are all rotated as well. As best shown in FIG. 9, the individual lift fingers 45b of the lift finger subassemblies 45 are positioned slightly below the vertical level of the rollers 50. As a result, when the rollers 50 are rotatably driven, the cartons 17 can be advanced freely through the accumulator 15 as shown.

Preferably, some of the rollers 50 are connected to their respective pulleys 50a in a press fit relationship. This provides a secure driving connection therebetween which insures positive movement of the cartons 17 in critical areas of the accumulator 15. However, others of the rollers 50 are connected to their respective pulleys 50 in a slip fit relationship. This slip fit relationship permits the cartons 17 to accumulate within the conveyor section of the accumulator 15 without excessive pressure being exerted thereon, which could possibly damage the cartons 17.

The drive shaft 55 may be a single shaft extending throughout the axial length of the accumulator 15, and the motor employed to rotate it may be either a constant speed motor or a variable speed motor. Alternatively, as shown in FIG. 9, the drive shaft 55 may be divided into a plurality of separate drive shaft sections, each of which is adapted to rotatably drive a small group of the rollers 50. In this instance, some of the drive shaft sections may be driven by constant speed motors, while others of the drive shaft sections may be driven by variable speed motors. By providing both constant and variable speed motors, the rollers 50 can be rotated at differing speeds to adjust the spacing between the adjacent cartons 17 within the accumulator 15. This may be desirable when the accumulator 15 is operated to store or release cartons 17, as will be described below.

As best shown in FIG. 9, one of the rollers 50 is not connected to the drive shaft 55 by an elastomeric band 56. Rather, this roller 50 is connected to a conventional blade stop assembly, indicated in dotted lines generally at 60. The blade stop assembly 60 includes a yoke 61 for rotatably supporting the roller 50 thereon, a stop plate 62 secured to the upstream side of the yoke 61, and a vertically movable shaft 63. The shaft 63 is connected to a conventional actuator (not shown), such as a pneumatic actuator, for selective vertical movement. Thus, the actuator is capable of selectively moving the stop plate 62 between a retracted position (illustrated in solid lines) and an extended position (illustrated in dotted lines). When the blade stop assembly 60 is moved to the retracted position, the roller 50 is aligned with the other rollers 50 of the accumulator 15. Thus, although the roller 50 mounted on the blade stop assembly 60 is not rotatably driven by any motor, it does permit cartons 17 to pass freely thereover when the other rollers 50 are so driven. However, when the blade stop assembly 60 is moved to the extended position, the stop plate 62 blocks the flow of cartons 17. Typically, a plurality of such blade stop assemblies 60 are provided within the accumulator 15, as will be described below.

Referring now to FIG. 10, there is schematically illustrated a control circuit, indicated generally at 70, for controlling the operation of the accumulator 15. The control circuit 70 is conventional in the art and can be embodied as a microprocessor or other computer. The control circuit 70 can interface with the operating equipment of the upstream processing station 11, the conveyor system 12, and the downstream processing station 13. To accomplish this, various sensors (not shown), including photoelectric devices and proximity sensors, may be provided to detect the locations and movements of cartons 17 at selected points on the conveyor system 12 and within the accumulator 15 itself. Additional sensors (not shown) may be provided to monitor the position of the lift rails 40 and other components of the accumulator 15. The control circuit 70 controls the operation of the various components in the manner described below.

The operation of the accumulator 15 will now be described. Initially, the motor 25 of the accumulator 15 is energized so as to move the endless chain and link subassemblies 30 to an initial loading position, wherein the first shelf A1 is aligned slightly below the horizontal lever of the rollers 50. This is accomplished by rotating the upper shaft 21 clockwise from the position illustrated in FIG. 3 until the A1 shelf is properly aligned with the rollers 50. By first moving the components of the accumulator 15 to this initial loading position, the maximum storage capacity of the accumulator 15 can be realized, as will become apparent below.

As discussed above, each of the first group of shelf positions A1 through A15 is defined by a plurality of lift finger subassemblies 45 having individual lift fingers 45b provided on both the upper and lower end flanges thereof. In the initial loading position, the lower individual lift fingers 45b are positioned slightly below the vertical level of the rollers 50, while the upper individual lift fingers 45b are positioned well above the upper surfaces of the cartons 17. As a result, when the rollers 50 are rotatably driven, the cartons 17 can be advanced freely through the accumulator 15 without engaging any of such individual lift fingers 45b, as described above.

During normal operation of the article handling system 10, the upstream processing station 11 and the downstream processing station 13 both function normally. Thus, the downstream processing station 13 is capable of handling all of the articles which are conveyed from the upstream processing station 11. In this situation, the accumulator 15 merely operates to convey articles from the first conveyor 14 to the second conveyor 16. To accomplish this, the drive shaft 55 is rotated by the motor as described above. As a result, the rollers 50 connected to the drive shaft 55 are also rotated so as to advance the cartons 17 from the intake end of the accumulator 15 (adjacent to the first conveyor 14) to the discharge end thereof (adjacent to the second conveyor 16). Also, all of the blade stop assemblies 60 are moved to the retracted positions illustrated in FIG. 9 such that the stop plates 62 are not positioned to block the movement of the cartons 17 across the rollers 50.

If the downstream processing station 13 subsequently becomes unable to continue accepting cartons 17 from the second conveyor 16, or if a jam occurs in flow of cartons 17 through the second conveyor 16, the cartons 17 will initially begin to back up on the second conveyor 16 downstream of the accumulator 15. This backup of cartons 17 is sensed by one or more of the sensors discussed above, and corresponding signals are sent to the control circuit 70. If the backup of cartons 17 is not cleared within a predetermined amount of time, the control circuit 70 can be operated to place the accumulator 15 into an accumulation mode of operation to prevent the further flow of cartons 17 downstream of the accumulator 15 until the problem is corrected.

In the accumulation mode of operation, the rotational speed of some of the rollers 50 is initially slowed relative to others of the rollers 50. This speed differential creates a gap of space between adjacent cartons 17 moving through the conveyor section of the accumulator 15. In response to a signal from a sensor (not shown) indicating that such gap has been formed, the control circuit 70 can actuate a first blade stop assembly 60 to move from its retracted position to its extended position. This first blade stop assembly 60 is typically located near the discharge end of the accumulator 15. As a result, the associated blade stop yoke 61 and stop plate 62 are moved upwardly into the gap between adjacent cartons 17 moving through the conveyor section of the accumulator 15. Such movement blocks the flow of cartons 17 out of the accumulator 15. Thus, cartons 17 which are located downstream of the extended blade stop assembly 60 will be conveyed out of the accumulator 15, but cartons 17 which are located upstream will be blocked therein.

The cartons 17 located upstream of the extended blade stop assembly 60 then begin to engage one another and back up within the conveyor section of the accumulator 15. The rollers 50 which are connected to their associated pulleys 50a in a slip fit relationship permit this to occur in a gentle fashion, as discussed above. Sensors located within the accumulator 15 monitor this backup and generate signals to the control circuit 70. When the cartons 17 have backed up to the intake end of the accumulator 15, the control circuit 70 actuates means (such as a conventional squeeze gate located immediately upstream of the intake end of the accumulator 15) for preventing the entry of additional cartons 17 into the accumulator 15. The control circuit 70 also actuates a second blade stop assembly between the first blade stop assembly and the discharge end of the accumulator 15. The control circuit 70 lowers the first blade stop assembly. The group of cartons 17 which had been backed up to the intake end of the accumulator 15 are then conveyed into the accumulator 15 until blocked by the second blade stop assembly. Upon confirmation from appropriate sensors that no cartons 17 remain in the intake end of the accumulator 15, the accumulator 15 is ready to accumulate the group of cartons 17 on the A1 shelf.

To accumulate a group of cartons 17 on the A1 shelf, the control circuit 70 actuates the motor 25 to rotate the upper shaft 21 in the counterclockwise direction when viewing FIG. 3. Thus, the upper sprockets 22 mounted on the upper shaft 21 are also rotated to cause movement of the associated endless chain and link subassemblies 30. As discussed above, the endless chain and link subassemblies 30 carry the lift rails 40 and the lift finger subassemblies 45. Consequently, all of the shelf positions A1 through D33 are indexed counterclockwise from the initial loading position to the next loading position, wherein the A2 shelf is aligned with the rollers 50 of the conveyor section of the accumulator 15.

When this occurs, the A1 shelf is elevated above the rollers 50. This is accomplished as the lower row of the individual lift fingers 45b move upwardly through the conveyor section, between the rollers 50 and the blade stop assemblies 60. Such movement of the individual lift fingers 45b causes them to engage the bottom surfaces of the cartons 17 and lift them upwardly off of the rollers 50. This upward movement continues until the next shelf A2 is indexed into the next loading position, similar to the initial loading position previously occupied by the A1 shelf. In this second loading position, the A2 shelf is prepared to accept a second row of cartons 17 for accumulation. When the A2 shelf has reached this next loading position, a conventional shelf position sensor (not shown) generates a signal to the control circuit 70 to stop the rotation of the upper shaft 21 by the motor 25. The shelf loading process and indexing process described above is then repeated for each of the shelf positions A2 through B28 as needed.

Preferably, the motor 25 which rotates the upper shaft 21 is a variable speed motor. When the accumulator 15 is indexed from one loading position to another, the motor 25 can be energized to initially accelerate to a relatively rapid speed, then decelerate as the index movement nears completion. Additional position sensors (not shown) may be provided to sense the movement of the lift rails 40 during the indexing process so as to permit the motor 25 to be controlled accordingly. Operation of the accumulator 15 in this manner minimizes wear on the indexing mechanism, permits faster and smoother operation, and provides for more gentle handling of the cartons 17 carried thereon.

As discussed above, all of the shelf positions in the first group A1 through A15 are defined by lift rails 40 having lift finger subassemblies 45 secured to both the upper and lower end flanges thereof. This is necessary because all of these first fifteen shelf positions A1 through A15 will be indexed up the one front side of the accumulator 15 (i.e., the right side when viewing FIG. 3), over the upper end, and down the back side thereof to fully fill the accumulator 15, as shown in FIG. 3. Thus, on the back side of the accumulator 15, the upper lift finger subassemblies 45 now support the cartons 17, instead of the lower lift finger subassemblies 45 on the front side thereof.

However, unlike the first group of shelf positions A1 through A15, none of the shelf positions in the second group B16 through B28 can be moved over the upper end of the accumulator 15. To do so would cause the first shelf A1 to be indexed so far downwardly along the back side of the accumulator 15 that it would begin moving under the lower end thereof. As a result, the cartons 17 carried thereon would be dumped off the A1 shelf. Thus, the shelf positions in the second group B16 through B28 always remain on the front side of the accumulator 15. Therefore, the second group of shelf positions B16 through B28 are provided only with one lower set of lift finger subassemblies 45.

For the same reason, no cartons 17 can be loaded onto and raised by the third group of shelf positions C29. However, as mentioned above, lift rails 40 are provided on the third group of shelf positions C29. These lift rails 40 function merely as inner guide rails to support the inner sides of the cartons which can be stored thereon in the conveyor section of the accumulator 15 (or merely conveyed therethrough), but not indexed upwardly. Thus, as discussed above, none of the lift rails 40 in the third group of shelf positions C29 are provided with any of the lift finger subassemblies. As also mentioned above, the fourth group of shelf positions D30 through D33 are not provided with any lift rails 40 or lift finger subassemblies 45, since none of the cartons 17 can be stored thereon. Thus, it will be appreciated that although the illustrated accumulator 15 defines a total of thirty-three shelf positions, only twenty-nine of such shelf positions can actually be used to store cartons 17 thereon.

Figure 11:
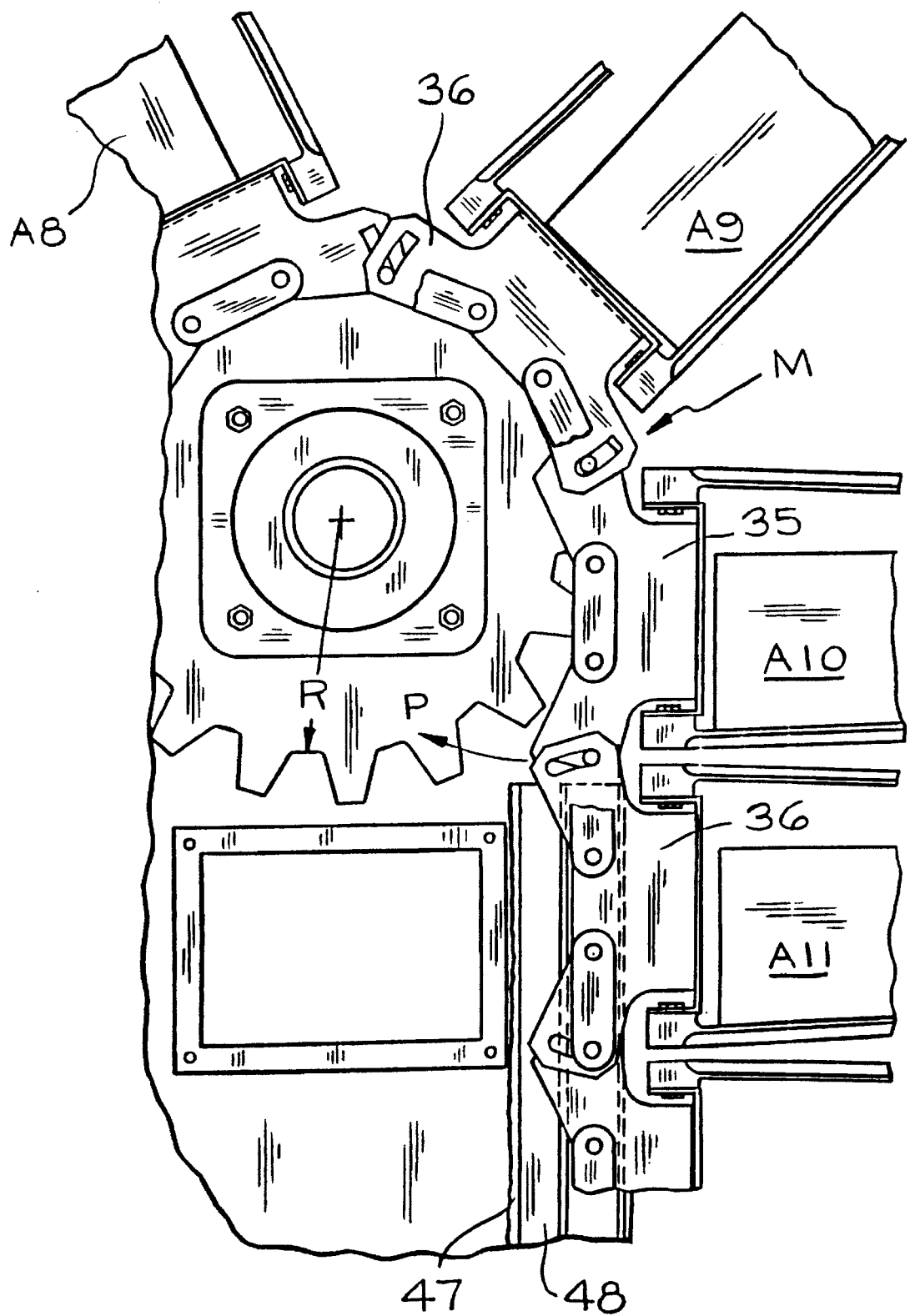
FIG. 11 is an enlarged end elevational view of the upper portion of the accumulator illustrated in FIG. 3.

FIG. 11 best illustrates how the endless chain and link subassemblies 30 function as the various shelf positions are moved up the front side of the accumulator 15 and over the upper portion thereof. There are three zones of operation in the accumulator 15. The first zone of operation is the vertical travel zone, which is illustrated by the outer link 36 carrying the A11 shelf. The vertical travel zone encompasses those areas of the accumulator 15 where the links 35 and 36 are guided solely by the cooperation of the rollers 32 of the endless chain and link subassembly 30 with the guide channels defined by the L-shaped brackets 47 and 48. This includes both links 35 and 36 which are moved vertically up the front side of the accumulator 15 and down the back side thereof.

As shown in FIG. 11, the outer link 36 carrying the A11 shelf is effectively supported on the lower three of the four elongated pins 33 which extend therethrough (namely, the second, third, and fourth when counting downwardly). As discussed above with reference to FIG. 6, the elongated pins 33 (which are carried on the rollers 32 disposed within the guide channel) extend through both the first pair of apertures 36b and through the arcuate slots 36d. The outer edges of the first pair of apertures 36b and the outer edges of the arcuate slots 36d are linearly aligned, as shown by the dotted line 36f in FIG. 6. As a result, undesirable tipping or pivoting movement of the outer link 36 carrying the A11 shelf (clockwise when viewing FIG. 11) under the weight exerted by the cartons 17 carried thereon is minimized because of the relatively long distance separating the second elongated pin 33 (extending through the upper one of the first pair of apertures 36b) from the fourth elongated pin 33 (extending through the lower one of the arcuate slots 36d).

In a conventional roller chain assembly, the links would be connected to only two adjacent elongated pins 33. This relatively short distance of separation would permit a much larger amount of this tipping or pivoting movement in the vertical travel zone for a given amount of play between the rollers 31 and the L-shaped brackets 47 and 48 of the guide channel. In the illustrated links, the distance of separation is much greater, resulting in much less ability for tipping or pivoting movement.

The second zone of operation is the transition zone, which is illustrated by the inner link 35 carrying the A10 shelf. The transition zone encompasses those areas of the accumulator 15 where the links 35 and 36 are located between the ends of the guide channels and the adjacent sprockets 22 and 24. Again, this includes links 35 and 36 entering into and exiting from both the upper sprockets 22 and the lower sprockets 24 of the accumulator 15, on both the front and back sides thereof.

As the inner link 35 carrying the A10 shelf is moved upwardly out of the guide channel defined by the first and second L-shaped brackets 47 and 48, the roller chain 31 carrying the inner link 35 carrying the A10 shelf meshes with the upper sprocket 22 at a point indicated by M. At that point M, the upper pin 33 of the inner link 35 carrying the A10 shelf engages the edge of the upper sprocket 22. At the same time, the lower pin 33 of the inner link 35 carrying the A10 shelf is beginning to exit from the upper end of the guide channel defined by the first and second L-shaped brackets 47 and 48.

Further rotation of the upper sprocket 22 causes the inner link 35 carrying the A10 shelf to move upwardly such that the lower pin 33 thereof is moved out of the guide channel. As a result, the inner link 35 carrying the A10 shelf is no longer supported by such guide channel. Because of the weight of the cartons 17 supported on the A10 shelf, there is a tendency for the lower end of the inner link 35 carrying the A10 shelf to tip or pivot inwardly toward the lower end of the upper sprocket 22, as indicated by the arrow P. This would be undesirable, inasmuch as such movement would cause the A10 shelf to angle downwardly and possible dump the cartons 17.

The structure of the inner links 35 and the outer links 36 minimizes this undesirable tipping or pivoting movement.

As discussed above, the lower slot 35d formed on the inner link 35 carrying the A10 shelf is mounted on the same elongated pin 33 of the roller chain 31 as the upper slot 36d formed on adjacent outer link 36 carrying the A11 shelf. The outer link 36 carrying the A11 shelf is, at this point, still guided within the guide channel defined by the first and second L-shaped brackets 47 and 48. Thus, the undesired movement of the inner link 35 carrying the A10 shelf is minimized by the outer link 36 carrying the adjacent A11 shelf. Consequently, it can be seen that the unique structure of the inner links 35 and the outer links 36 minimizes this undesired movement as such links 35 and 36 are transferred through the transition zones.

The third zone of operation is the rotary travel zone, which is illustrated by the outer link 36 carrying the A9 shelf. The rotary travel zone encompasses those areas of the accumulator 15 where the links 35 and 36 are guided solely by the cooperation of the rollers 32 of the endless chain and link subassembly 30 with the upper and lower sprockets 22 and 24. This includes both links 35 and 36 which are moved over the upper portion of the accumulator 15 and under the lower portion thereof.

As shown in FIG. 11, the outer link 36 carrying the A9 shelf is effectively supported on all four of the elongated pins 33 which extend therethrough. As discussed above with reference to FIG. 6, the elongated pins 33 (which are carried on the rollers 32 disposed within the guide channel) extend through both the first pair of apertures 36b and through the arcuate slots 36d. The inner edges of the first pair of apertures 36b and the inner edges of the arcuate slots 36d are aligned along an arc defined by a radius R, as shown by the dotted line 36g in FIG. 6. This radius R is equal to the radius of each of the upper and lower sprockets 22 and 24, as shown in FIG. 11. Thus, undesirable tipping or pivoting movement of the outer link 36 carrying the A9 shelf when the cartons 17 are moved over the upper portion of the accumulator 15 is minimized because the links 35 and 36 are fully supported on the sprockets 22 and 24.

The accumulator 15 will continue to accumulate cartons 17 on the shelf positions A1 through C29 until sensors (not shown) on the second conveyor 15 indicate that the backup has been cleared, or until all of such shelf positions A1 through C29 are filled with cartons 17. When the backup has been cleared, the control circuit 70 can be operated to place the accumulator 15 into a de-accumulation mode of operation to re-start the flow of cartons 17 downstream of the accumulator 15. The de-accumulation mode of operation is essentially the reverse of the accumulation mode described above, with each of the shelf positions C29 through A1 being sequentially lowered when appropriate such that the cartons 17 are placed onto the rollers 50. The rollers 50 then convey the cartons 17 out of the accumulator 15 so that the next shelf can be lowered.

As discussed above, the illustrated accumulator 15 is provided with thirty-three shelf positions, each being provided with lift rails 40 and lift finger subassemblies 45 capable of storing one row of cartons 17 thereon. This invention contemplates each of the shelf positions can, if desired, be capable of storing two or more rows of cartons thereon. This can be accomplished by modifying the structures of the lift rails 40 and the lift finger subassemblies 45 such that each shelf position is sub-divided by two or more rows of individual lift fingers 45b. Such sub-divided rows can be filled in the same manner as described above, except that the motor 25 would be operated to index the endless chain and link subassemblies 30 only partially between adjacent shelf positions. The sub-divided rows of individual lift fingers 45b would move as a unit, inasmuch as they would all be carried upon a single one of the inner and outer links 35 and 36.

Figure 12:
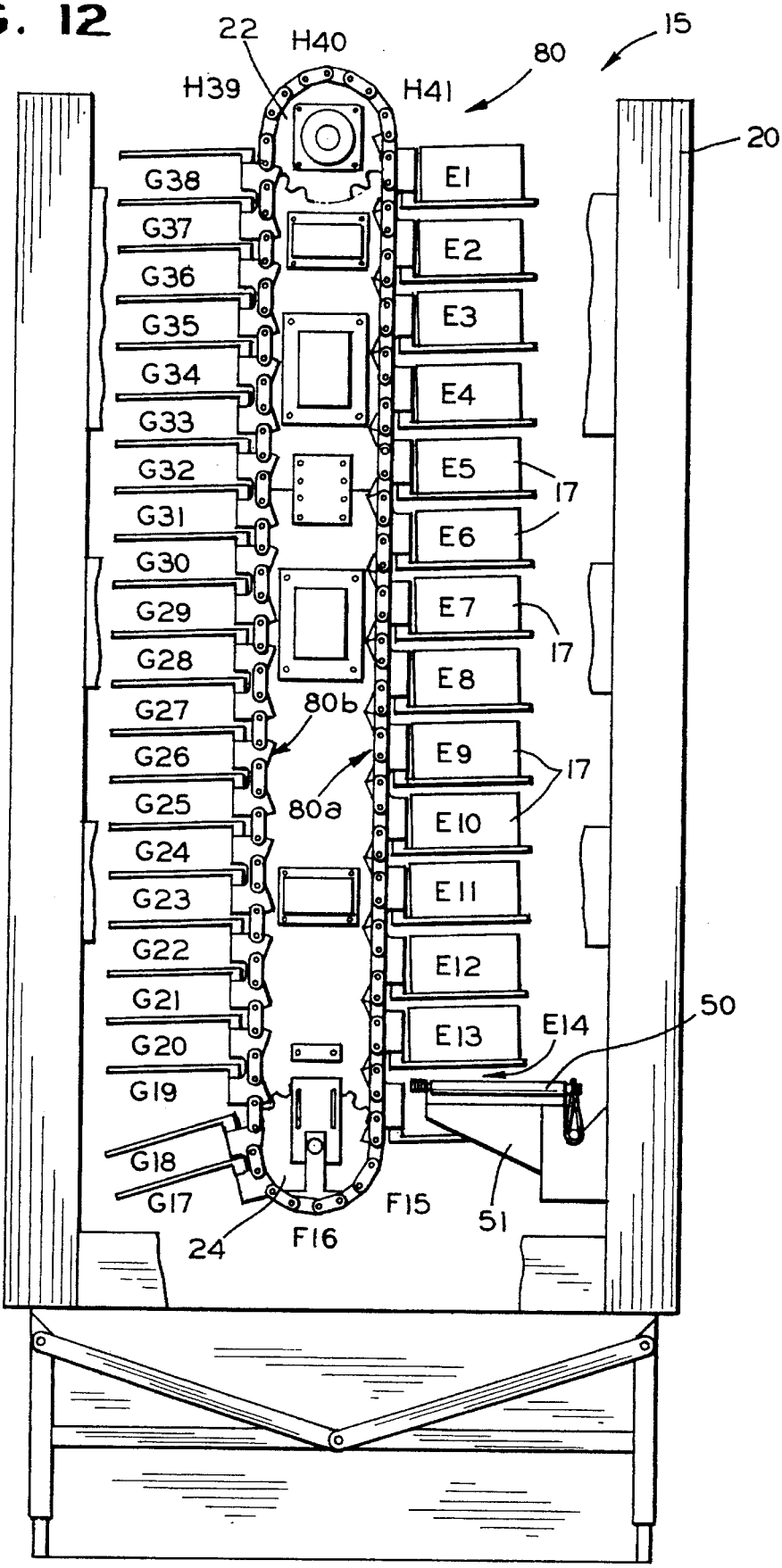
FIG. 12 is an end elevational view similar to FIG. 3, schematically showing a second embodiment of the endless chain and link subassembly in accordance with this invention.

Referring now to FIG. 12, a second embodiment of an endless chain and link subassembly is illustrated generally at 80. The second embodiment of the endless chain and link subassembly 80 is mounted on the accumulator 15 in a manner which is similar to the first embodiment of the endless chain and link subassembly 30 discussed above, and like reference numbers are used to indicate similar parts. Each of the two subassemblies 80 (only one is illustrated) extends about the upper sprocket 22 and the lower sprocket 24 and is driven by the upper sprocket 22 as described above. Each of the subassemblies 80 can be divided into first and second sections 80a and 80b. The first section 80a is identical in structure and operation to the subassembly 30 described above. The second section 80b, however, differs in that structure is provided for sub-dividing each of the rows, as will be explained in detail below.

Figure 13:
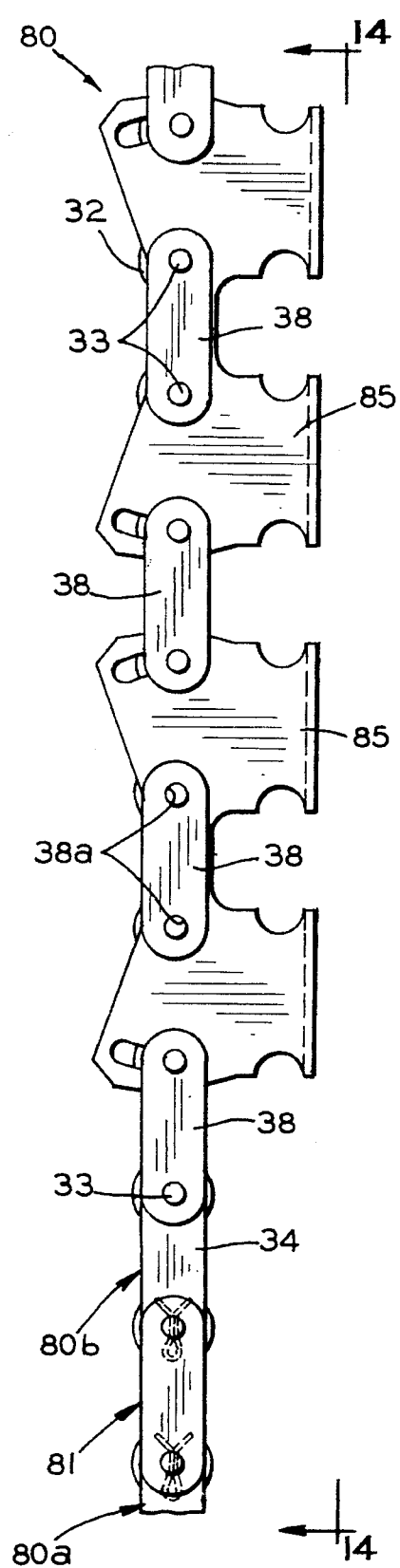
FIG. 13 is an enlarged end elevational view of a portion of the endless chain and link subassembly shown in FIG. 12, the fingers of the subassembly having been removed for clarity.
Figure 14:
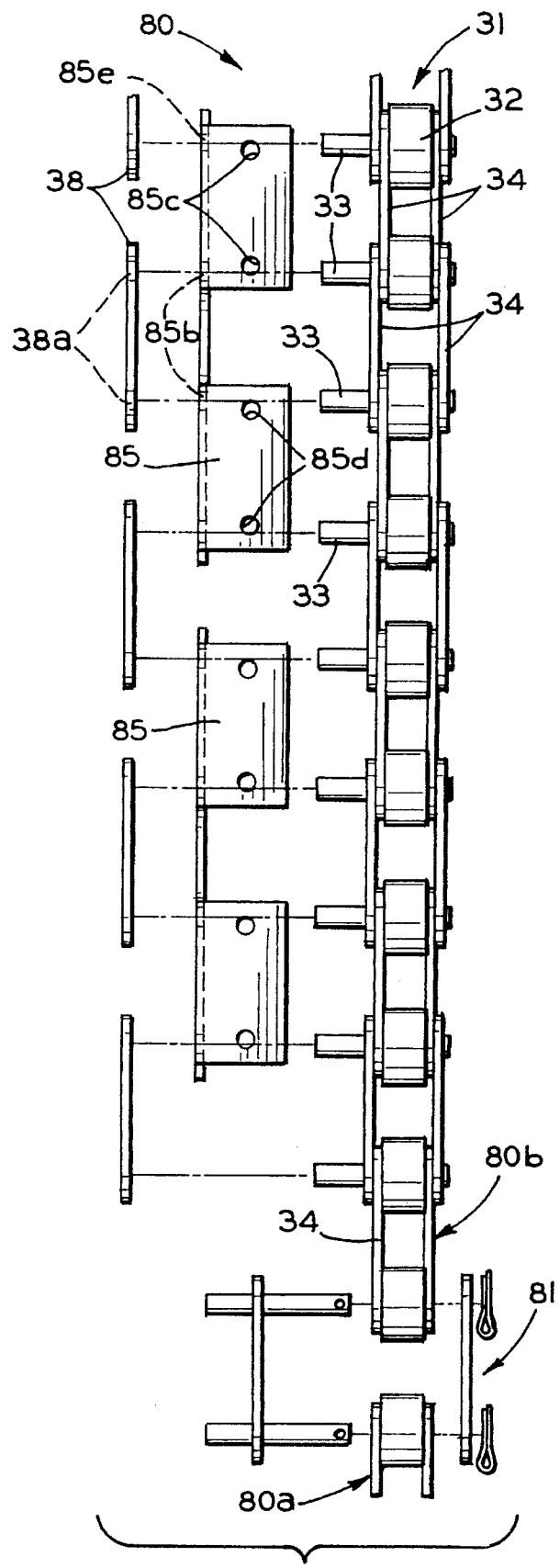
FIG. 14 is an exploded view of the portion of the chain and link subassembly taken along line 14—14 of Fig. 13.

The structure of the second section 80b of the endless chain and link subassembly 80 is illustrated in more detail in FIGS. 13 and 14. As shown therein, the subassembly 80 is supported on the roller chain 31, which includes the rollers 32, the pins 33, and the connecting members 34. If desired, the roller chain 31 may be divided into two or more sections, such as one for each of the first and second sections 80a and 80b of the subassembly 80. If so, a conventional connector 81 can be provided for connecting the adjacent ends of various sections of the roller chain 31, as shown in FIGS. 13 and 14.

Figure 15:
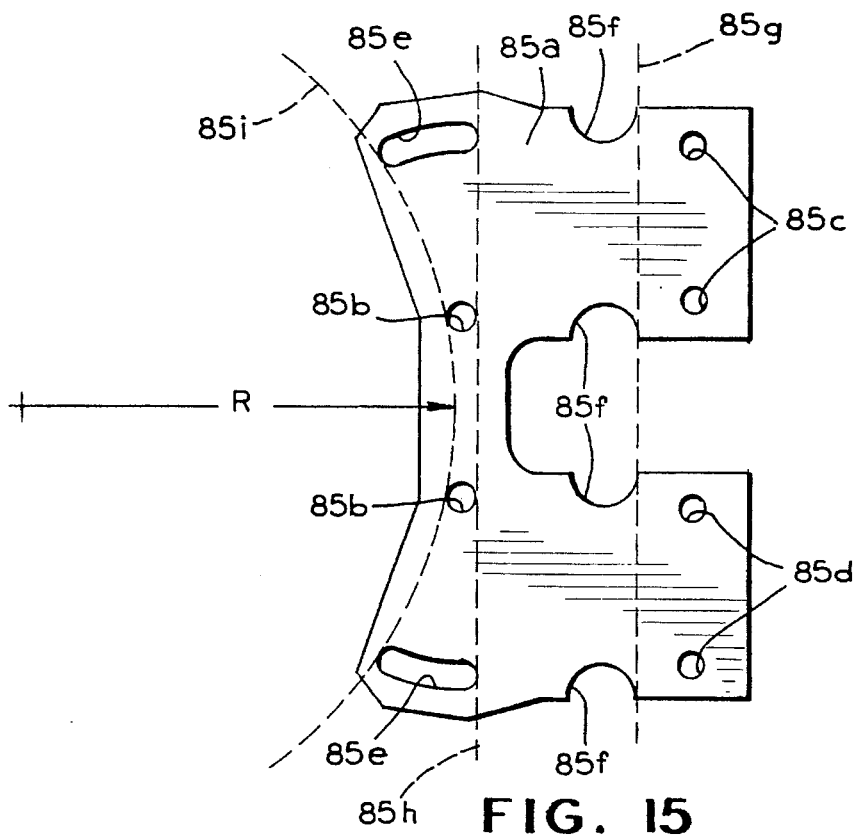
FIG. 15 is an enlarged elevational view of one of the links illustrated in FIGS. 13 and 14, wherein a pair of end portions thereof are shown in a preliminary flat condition.

A plurality of links 85 is secured to the roller chain 31 of the subassembly 80. The structure of one of the links 85 is illustrated in detail in FIG. 15. As shown therein, the link 85 can be manufactured from a flat blank 85a of metallic material. The blank 85a is generally rectangular in shape, but is provided with a pair of opposed ear portions which extend generally apart from one another, and a pair of parallel extending tabs. A first pair of apertures 85b are formed through the blank 85a between the ear portions. Second and third pairs of apertures 85c and 85d are formed through respective ones of the tabs on the blank 85a. A pair of arcuate slots 85e are formed through the ear portions of the blank 85a. A pair of opposed semicircular notches 85f are formed on each of the tabs adjacent to the respective ear portions.

Figure 16:
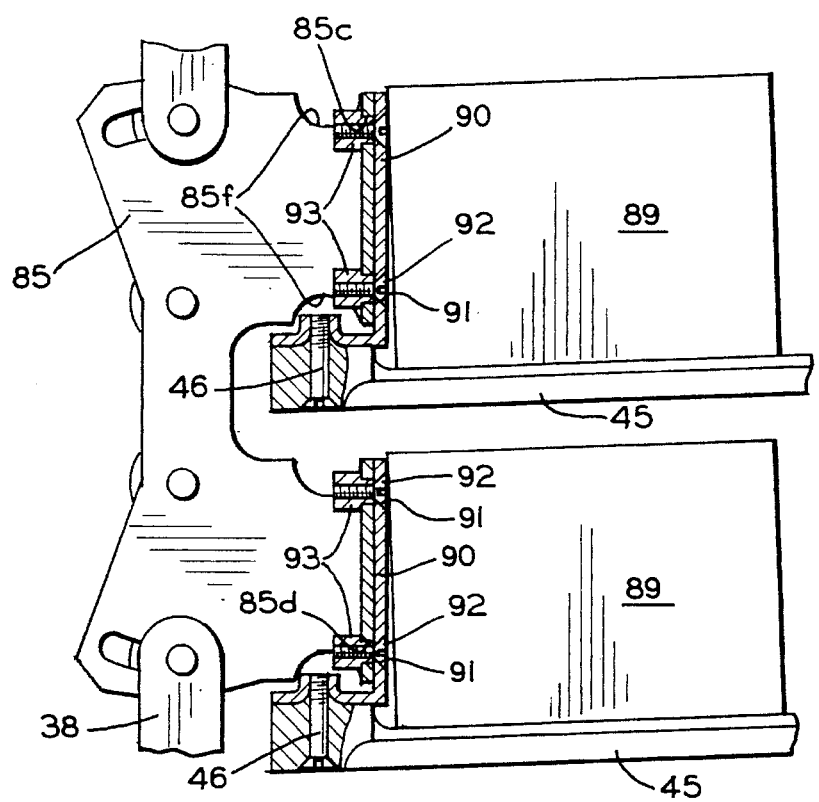
FIG. 16 is an elevational view similar to FIG. 15 showing the link after the end portions thereof have been bent and illustrating the manner in which the fingers are secured thereto.

The blanks 85a, as well as the apertures 85b, 85c, and 85d, and the arcuate slots 85e, may be formed by any conventional metal forming process, such as stamping. Then, a portion of each of the tabs of the blank 85a is bent along a dotted line 85g so as to extend perpendicular to the remainder thereof to form the link 85, as shown in FIG. 16. The outer edges (the right edges when viewing FIG. 15) of the first pair of apertures 85b and the outer edges of the arcuate slots 85e are linearly and vertically aligned, as shown by the dotted line 85h. The inner edges (the left edges when viewing FIG. 15) of the first pair of apertures 85b and the inner edges of the arcuate slots 85e are aligned along an arc defined by a radius R, as shown by the dotted line 85i. All of the links 85 are formed in this manner, for the same reasons set forth above with respect to the links 35 and 36.

Referring back to FIGS. 13 and 14, it can be seen that each of the links 85 is mounted on four adjacent pins 33 of the roller chain 31. Thus, when one of the links 85 is installed on the roller chain 31, the elongated pins 33 are received through each of the first apertures 85b and each of the slots 85e. As also shown in FIG. 14, adjacent ones of the links 85 are mounted on adjacent sets of four elongated pins 33. The first apertures 85*b* and the slots 85*e* are sized to be slightly larger than the diameters of the elongated pins 33 received therein. Thus, the links 85 are only loosely mounted on such pins 33 so as not to inhibit the free movement thereof. Means are provided for retaining the links 85 on the pins 33 of the roller chain 31 during use. This means for retaining may include the retainer brackets 38 described above which are press fit onto each pair of pins 33. In this embodiment of the endless chain and link subassembly 80, adjacent links 85 do not overlap one another. Thus, when the subassembly 80 is assembled as described above, none of the links 85 are offset from the roller chain 31. Therefore, there is no need for spacers similar to the spacers 37 described in the first embodiment above.

As shown in FIG. 12, forty-one shelf positions are defined throughout the length of the endless chain and link subassembly 80. Thirty-six of such shelf positions are adapted to store respective pluralities of cartons thereon, in a manner similar to that of the first embodiment described above. However, as with the first embodiment, a small number of the shelf positions cannot store any cartons thereon.

A first group of shelf positions (the first through the fourteenth) is identified in FIG. 12 as E1 through E14, and is located in the first section 80*a* of the subassembly 80. As mentioned above, the structure of the links 85 used in this first section 80*a* is similar to the links 35 and 36 described above. A second group of shelf positions (the fifteenth and sixteenth) is identified in FIG. 12 as F15 and F16, and is also located in the first section 80*a* of the subassembly 80. A third group of shelf positions (the seventeenth through the thirty-eighth) is identified in FIG. 12 as G17 through G38, and is located in the second section 80*b* of the subassembly 80. A fourth group of shelf positions (the thirty-ninth through forty-first) is identified in FIG. 12 as H39 through H41, and is also located in the first section 80*a* of the subassembly 80.

Referring now to FIG. 16, the structure of the third group of shelf positions is illustrated in detail. As shown therein, each of the links 85 is has a pair of lift rails 90 secured to the tabs thereof. Each of the lift rails 90 includes a vertically extending central portion which is secured to the associated tab of the link 85 by a pair of threaded fasteners 91. The threaded fasteners 91 of the upper lift rail 90 extend through respective apertures 92 formed on the lift rail 90 and through the aligned second apertures 85*c* formed on the tab on the link 85 into engagement with corresponding nuts 93. Similarly, the threaded fasteners 91 of the lower lift rail 90 extend through respective apertures 92 formed on the lift rail 90 and through the aligned third apertures 85*d* formed on the tab on the link 85 into engagement with corresponding nuts 93.

A lift finger subassembly 45 is secured to horizontally extending lower portion of each of the lift rails 90. The lift finger subassemblies 45 are secured to the end flange of each lift rail 90 by threaded fasteners 46 which extend through aligned apertures formed therein. In the illustrated embodiment, the apertures formed through the end flanges of the lift rails 90 are provided with respective threaded extruded portions into which the threaded fasteners 46 are received. However, the lift finger subassemblies 45 may be secured to the lift rail 90 by any conventional means. The notches 85*f* provide clearance for the threaded extruded portions of the end flanges of the lift rails and the threaded fasteners 46.

It should be noted that the lift rail 90 may be formed having an inverted-C cross sectional shape, similar to the lift rail 40 described above. Two lift finger subassemblies 45 could then be attached to each of the lift rails, permitting the cartons 89 to be supported thereby during movement through the upper rotary travel zone, over the top of the upper sprocket 22. The notches 85*f* on either side of each tab on the link 85 would provide clearance for the threaded extruded portions of both flanges of such a lift rail. It will be appreciated that adding a second lift finger subassembly 45 to each of the lift rails 90 limits the height of cartons 89 which may be supported at the associated shelf position to something less than the height of the cartons 17 described above.

Referring back to FIG. 12, the operation of the accumulator 15 will be briefly explained. When it is desired to process relatively large cartons 17, the accumulator 15 can be operated using the shelf positions E1 through E14 in the manner described above. When it is desired to process relatively short cartons 89, the accumulator 15 can be operated using the shelf positions G17 through G38. Each of the shelf positions may be provided with a proximity switch (not shown) to signal the position thereof to the control circuit 70. Thus, in the accumulation and de-accumulation modes of operation, the control circuit 70 will increment the endless chain and link subassemblies 80 once for each link 85 when the shelf positions E1 through E14 are being used, and twice for each link 85 when the shelf positions G17 through G38 are being used.

In this second embodiment, no provision is made to support the cartons 17 or 89 in the upper rotary travel zone. Thus, no shelves are needed in the shelf positions F15, F16, H39, H40, or H41, inasmuch as these shelf positions will be in either the lower and upper rotary travel zones when the shelf positions E1 through E14 are full of cartons 17, and when the shelf positions G17 through G38 are full of cartons 89. Of course, additional shelves could be added if desired to support the cartons 17 and 89 in the upper rotary travel zone.

By providing different structures for the first and second sections 80*a* and 80*b* of the endless chain and link subassembly 80, the accumulator 15 is provided with additional flexibility of operation. The accumulator 15 can rapidly and easily be switched between operation to accumulate both large cartons 17 and short cartons 89.

This invention also contemplates that the accumulator 15 may be adapted to accommodate more than two sizes of packages on a single endless chain and link subassembly 80. For example, the lift finger subassemblies 45 associated with the shelf positions E2, E4, and E6 may be removed to permit the accumulation of cartons taller than the cartons 17 on the lift finger subassemblies associated with shelf positions E1, E3, E5, and E7.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An accumulator for movably supporting an article comprising:

a frame;

a wheel rotatably supported upon said frame, said wheel defining a radius;

means for selectively rotating said wheel;

a member engaged with said wheel for movement when said wheel is rotated;

a link carried on said member for movement therewith, said link having at least one aperture formed therethrough and at least one slot formed therethrough, said aperture and said slot having first edges which define a straight line and having second edges which define a radius which is substantially equal to said radius defined by said wheel, said link further including a pair of tabs extending therefrom; and means secured to each of said tabs of said link for supporting an article thereon for movement with said link and said member when said wheel is rotated.

2. The accumulator defined in claim 1 wherein said wheel is a sprocket and said member is a chain engaged with said sprocket.

3. The accumulator defined in claim 1 wherein said wheel is a first wheel, and further including a second wheel rotatably supported on said frame, said member being engaged with both said first wheel and said second wheel.

4. The accumulator defined in claim 3 wherein said second wheel defines a radius which is equal to said radius defined by said first wheel.

5. The accumulator defined in claim 1 wherein said member is formed as an endless loop.

6. The accumulator defined in claim 1 further including first and second pins supported on said member, said first pin extending through said aperture of said link and said second pin extending through said slot of said link.

7. The accumulator defined in claim 1 wherein said link further includes a second aperture formed therethrough, said first and second apertures and said slot having first edges which define a straight line and having second edges which define a radius which is substantially equal to said radius defined by said wheel.

8. The accumulator defined in claim 7 further including first, second, and third pins supported on said member, said first pin extending through said first aperture of said link, said second pin extending through said second aperture of said link, and said third pin extending through said slot of said link.

9. The accumulator defined in claim 1 wherein said link further includes a second slot formed therethrough, said aperture and said first and second slots having first edges which define a straight line and having second edges which define a radius which is substantially equal to said radius defined by said wheel.

10. The accumulator defined in claim 9 further including first, second, and third pins supported on said member, said first pin extending through said aperture of said link, said second pin extending through said first slot of said link, and said third pin extending through said second slot of said link.

11. The accumulator defined in claim 1 wherein said link further includes a second aperture and a second slot formed therethrough, said first and second apertures and said first and second slots having first edges which define a straight line and having second edges which define a radius which is substantially equal to said radius defined by said wheel.

12. The accumulator defined in claim 11 further including first, second, third, and fourth pins supported on said member, said first pin extending through said first aperture of said link, said second pin extending through said second aperture of said link, said third pin extending through said first slot of said link, and said fourth pin extending through said second slot of said link.

13. The accumulator defined in claim 1 further including a plurality of links carried on said member for movement therewith, each of said links having at least one aperture formed therethrough and at least one slot formed therethrough, said aperture and said slot of each of said first links having first edges which define a straight line and having second edges which define a radius which is substantially equal to said radius defined by said wheel.

14. The accumulator defined in claim 1 wherein said means secured to each of said tabs of said link for supporting an article thereon includes a lift finger mounted on each of said tabs of said link.

15. The accumulator defined in claim 14 wherein each of said lift fingers extends at an angle relative to a plane extending perpendicular to a plane defined by said link.

16. The accumulator defined in claim 1 wherein said means secured to each of said tabs of said link for supporting an article includes a pair of lift fingers mounted on opposite ends of each of said tabs of said link.

17. The accumulator defined in claim 16 wherein each of said lift fingers extends at an angle relative to a plane extending perpendicular to a plane defined by said link.

18. The accumulator defined in claim 17 wherein said lift fingers extend inwardly toward one another.

19. The accumulator defined in claim 1 wherein each of said tabs has a semicircular recess formed therein.

20. The accumulator defined in claim 1 wherein each of said tabs has a pair of semi-circular recess formed therein.

* * * * *